United States Patent
Li et al.

(10) Patent No.: US 12,073,630 B2
(45) Date of Patent: Aug. 27, 2024

(54) MOVING OBJECT TRACKING METHOD AND APPARATUS

(71) Applicant: HUAWEI TECHNOLOGIES CO., LTD., Guangdong (CN)

(72) Inventors: Wanlong Li, Beijing (CN); Xueshi Li, Shenzhen (CN); Yajun Gao, Beijing (CN); Feng Wen, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 357 days.

(21) Appl. No.: 17/513,859

(22) Filed: Oct. 28, 2021

(65) Prior Publication Data
US 2022/0051031 A1   Feb. 17, 2022

Related U.S. Application Data

(63) Continuation of application No. PCT/CN2020/087842, filed on Apr. 29, 2020.

(30) Foreign Application Priority Data

Apr. 29, 2019   (CN) .......................... 201910353672.3

(51) Int. Cl.
*G06T 7/246*   (2017.01)
*G06T 7/277*   (2017.01)
(Continued)

(52) U.S. Cl.
CPC .............. *G06V 20/56* (2022.01); *G06T 7/246* (2017.01); *G06T 7/277* (2017.01); *G06V 10/25* (2022.01);
(Continued)

(58) Field of Classification Search
CPC ..................................................... G06V 20/56
See application file for complete search history.

(56) References Cited

U.S. PATENT DOCUMENTS

2014/0341465 A1* 11/2014 Li ..................... G01C 21/1656
  382/160
2016/0140729 A1* 5/2016 Soatto ..................... G06T 7/277
  348/135
(Continued)

FOREIGN PATENT DOCUMENTS

CN      105931275 A      9/2016
CN      107656545 A      2/2018
(Continued)

OTHER PUBLICATIONS

Wen Kun, Research on Multi-state and Multi-view Constraint Algorithms for Vision/inertial Integrated Navigation. National Defense Science and Technology University, 2019, 1 page.
(Continued)

*Primary Examiner* — Oneal R Mistry
(74) *Attorney, Agent, or Firm* — James Harrison

(57) ABSTRACT

This disclosure provides a moving object tracking method and apparatus. The method includes: obtaining a current frame captured by a camera; predicting a current state vector of the camera based on an inertial measurement unit IMU and the current frame, to obtain a predicted value of the current state vector of the camera; predicting a current state vector of a target object that is moving in the current frame, to obtain a predicted value of the current state vector of the target object; and updating a Kalman state vector based on a measurement result of an image feature in the current frame. According to technical solutions provided in this disclosure, a target object that is moving in a surrounding environment can be tracked and a pose of the target object can be estimated while a pose of a system can be estimated.

14 Claims, 5 Drawing Sheets

(51) Int. Cl.
*G06V 10/25* (2022.01)
*G06V 20/56* (2022.01)

(52) U.S. Cl.
CPC .............. *G06T 2207/30244* (2013.01); *G06T 2207/30252* (2013.01)

(56) References Cited

U.S. PATENT DOCUMENTS

| | | | |
|---|---|---|---|
| 2016/0327395 | A1 | 11/2016 | Roumeliotis et al. |
| 2017/0261324 | A1 | 9/2017 | Roumeliotis et al. |
| 2018/0112985 | A1 | 4/2018 | Madison |
| 2019/0333231 | A1* | 10/2019 | Zhu .................. G01C 11/04 |
| 2021/0370968 | A1* | 12/2021 | Xiao ................ G01S 7/4808 |
| 2022/0026920 | A1* | 1/2022 | Ebrahimi Afrouzi ................ G05D 1/0219 |

FOREIGN PATENT DOCUMENTS

| | | |
|---|---|---|
| CN | 108120438 A | 6/2018 |
| CN | 108364304 A | 8/2018 |
| CN | 108458745 A | 8/2018 |
| CN | 108921898 A | 11/2018 |
| CN | 109387198 A | 2/2019 |
| CN | 110160522 A | 8/2019 |
| CN | 110211151 A | 9/2019 |

OTHER PUBLICATIONS

Xingxing Zuo et al., Robust Visual SLAM with Point and Line Features, Nov. 23, 2017, 8 pages.
K. Eckenhoff, Y. Yang, P. Geneva and G. Huang, "Tightly-Coupled Visual-Inertial Localization and 3-D Rigid-Body Target Tracking," in IEEE Robotics and Automation Letters, vol. 4, No. 2, pp. 1541-1548, Apr. 2019, doi: 10.1109/LRA.2019.2896472.
Cai Yingbo, Multi-State Constraint Algorithm for Vision-aided Inertial Navigation System. Optics and Optoelectronic Technology, vol. 13, No. 6, Dec. 2015, 5 pages.
N. P. Koenig and A. Howard. \Design and use paradigms for Gazebo, an open-source multi-robot simulator. In: Citeseer,2004, 6 pages.
Trung Nguyen et al., Developing a Cubature Multi-state Constraint Kalman Filter for Visual-Inertial Navigation System. 2017 14th Conference on Computer and Robot Vision (CRV), Feb. 8, 2018, 8 pages.
C.-C. Wang et al.Simultaneous Localization, Mapping and Moving Object Tracking. In: The International Journal of Robotics Research 26.9 (Sep. 2007), pp. 889-916.
Chojnacki, Michael, and Vadim Indelman. "Vision-based dynamic target trajectory and ego-motion estimation using incremental light bundle adjustment." International Journal of Micro Air Vehicles 10.2 (2018): 157-170.
Stereo Vision-based Semantic 3D Object and Ego-motion Tracking for Autonomous Driving. In: ArXiv e-prints (Jul. 2018), 16 pages.

* cited by examiner

MOVING OBJECT TRACKING METHOD AND APPARATUS

CROSS-REFERENCE TO RELATED APPLICATION

This application is a continuation of International Application No. PCT/CN2020/087842, filed on Apr. 29, 2020, which claims priority to Chinese Patent Application No. 201910353672.3, filed on Apr. 29, 2019. The disclosures of the aforementioned applications are hereby incorporated by reference in their entireties.

TECHNICAL FIELD

This disclosure relates to the field of pose estimation technologies, and more specifically, to a method and apparatus for tracking moving objects.

BACKGROUND

As an inseparable part of various intelligent/autonomous systems in various application fields, for example, fields such as manufacturing, testing, document analysis, medical diagnosis, and military, computer vision is a learning about how to use a camera/video camera and a computer to obtain required data and information about a photographed object. Analogously, the computer is equipped with an eye (the camera/video camera) and a brain (an algorithm) to replace human eyes to recognize, track, and measure a target, to enable the computer can sense an environment. Because the "sense" may be considered as extracting information from a sensory signal, computer vision may also be considered as a science of studying how to make an artificial system "sense" an image or multi-dimensional data. In general, computer vision is obtaining input information by various imaging systems instead of a visual organ, and then processing and interpreting the input information by a computer instead of a brain. An ultimate research goal of computer vision is to enable a computer to observe and understand the world like a human being, and to be able to adapt to an environment.

Moving target detection and tracking is a branch of image processing and computer vision, and is of great significance in both theory and practice. In scenarios such as automated driving, military reconnaissance, and augmented reality (AR) dynamic tracking, a mobile platform needs to be capable of estimating a pose of the mobile platform. In addition, the mobile platform further needs to track a target object that is moving in a surrounding environment and estimate a pose of the target object.

Currently, a commonly used positioning manner on a mobile platform is estimating a pose of the mobile platform based on visual information captured by a camera, and estimating, based on the pose of the mobile platform, a pose of a target object in the moving state in a surrounding environment. However, because the camera has noise, accuracy of the pose of the mobile platform that is estimated only by using the visual information is relatively low. Therefore, accuracy of the estimated pose of the target object in the moving state is relatively low.

A multi-state constraint Kalman filter (multi-state constraint Kalman filter, MSCKF) may estimate a pose of the MSCKF by using visual information captured by a camera and a measurement result of an inertial measurement unit (inertial measurement unit, IMU). Accuracy of the pose is relatively high. However, the MSCKF can estimate only the pose of the MSCKF, which cannot estimate a pose of a target object in the moving state in a surrounding environment.

SUMMARY

This disclosure provides a method and an apparatus, so that a target object that is moving in a surrounding environment can be tracked and a pose of the target object can be estimated while a pose of an executor can be estimated.

According to a first aspect, a moving object tracking method is provided, including:
    obtaining a current frame captured by a camera;
    predicting a current state vector of the camera based on an inertial measurement unit IMU and the current frame, to obtain a predicted value of the current state vector of the camera, where the current state vector of the camera is used to indicate a current pose of the camera;
    predicting a current state vector of a target object that is moving in the current frame, to obtain a predicted value of the current state vector of the target object, where the current state vector of the target object is used to indicate a current pose of the target object;
    generating a Kalman state vector based on the predicted value of the current state vector of the camera and the predicted value of the current state vector of the target object; and
    updating the Kalman state vector based on a measurement result of an image feature in the current frame, to obtain an updated Kalman state vector, where the updated Kalman state vector is used to indicate that the target object is tracked.

It should be understood that the IMU is an apparatus for measuring a three-axis attitude angle (or an angular rate) and acceleration of an object. Generally, one IMU includes three single-axis accelerometers and three single-axis gyroscopes. The accelerometers detect acceleration signals of an object on three independent axes of a coordinate system of a carrier. The gyroscopes detect signals of angular velocities of the carrier relative to a navigation coordinate system, to measure an angular velocity and acceleration of the object in a three-dimensional space, to calculate an attitude of the object.

In a possible implementation, a Jacobian matrix of an image feature of the current frame is calculated based on an image feature of a background part in the current frame and an image feature of the target object; and the predicted value of the current state vector of the target object and the predicted value of the current state vector of the camera that are included in the Kalman state vector are updated based on the Jacobian matrix of the image feature of the current frame.

It should be understood that the image feature may be a feature point in the image captured by the camera. In image processing, the feature point is a point at which a grayscale value of the image drastically changes or a point at which a curvature is relatively large on an edge of the image (that is, an intersection point of two edges). The image feature point plays an important role in a feature point-based image matching algorithm. The image feature point can reflect an essential feature of the image, and can identify a target object in the image. Image matching can be completed through feature point matching.

In another possible implementation, a dynamic feature point in the current frame is determined, where the dynamic feature point includes a representation point and a non-representation point, the representation point is used as an origin of a coordinate system of the target object, and the non-representation point is used to represent another dynamic feature point other than the representation point on the target object; and the current state vector of the target object in the moving state in the current frame is predicted based on an attitude of the representation point and a random motion model, to obtain the predicted value of the current state vector of the target object.

It should be understood that there are two types of target segmentation algorithms. One type is to frame a target by using a bounding box, and the other type is to perform segmentation at a pixel-level precision for a target. A segmentation precision of the first-type method is obviously lower than that of the second-type method, but a calculation amount of the second-type method is relatively large. Considering a real-time requirement, in this disclosure, the first-type method is used to perform target segmentation.

For a dynamic target observed the first time, it is necessary to determine a parameter needed for a complete description of motion of a rigid body. In this disclosure, the dynamic target is initialized by using dynamic feature points on a surface of the dynamic target, and the feature points are classified into a "representation point" and a "non-representation point" to represent the dynamic target.

In this embodiment of this disclosure, the initialization of the dynamic target can improve correctness of adding the dynamic target to a system state vector, and improve system robustness.

In this disclosure, it is assumed that a to-be-tracked target is a rigid body. In other words, the target does not deform while moving. Generally, 6 degrees of freedom may be used to describe a pose of the rigid body. A typical representation manner is to use a feature point (representation point) on the rigid body and a direction to represent the pose of the rigid body. However, when the representation point is blocked while the target is moving, the representation point cannot be observed and the method is invalid or fails, although an unblocked part of the rigid body can still be observed.

In this disclosure, a group of feature points rather than a single feature point on the surface of the dynamic target are used to represent the dynamic target. To clearly indicate a position of the rigid body, a "representation point" is required, and a position of the "representation point" in a global coordinate system is denoted as $^G p_T$. All observed feature points on the rigid body are "non-representation points", except for the "representation point". Because a single "representation point" cannot represent a 6-degree-of-freedom pose of the rigid body, a "non-representation point" needs to be used as an auxiliary "representation point" to represent the pose of the rigid body. A coordinate of the "non-representation point" in a coordinate system of the rigid body is denoted as $^T p_{ft}$.

According to a property of the rigid body, a relative position relationship between these feature points does not change with motion of the rigid body. In other words, positions of these feature points in a coordinate system that is static relative to the rigid body do not change. Therefore, $^T p_{ft}$ is a constant that does not change with time. In such a representation method, even if the dynamic target is partially blocked, a position of the representation point can still be calculated and the rigid body can still be successfully tracked provided that some feature points of the dynamic target can be observed.

A feasible solution for selecting a "representation point" and a "non-representation point" is to use a representation point (one of representation points) observed the first time as a "representation point" of a rigid body.

In another possible implementation, the method further includes: when the representation point is blocked, calculating the attitude of the representation point by using an attitude of the non-representation point.

In another possible implementation, the target object in the moving state in the current frame is framed by using a bounding box; and a feature point in the bounding box is determined as the dynamic feature point.

In another possible implementation, when the target object in the moving state is observed in a plurality of frames of images before the current frame, the predicted value of the current state vector of the target object is added to a sliding window, to generate the Kalman state vector, where the sliding window includes the predicted value of the current state vector of the camera.

Optionally, a system does not remove the dynamic target from the system state vector when the dynamic target is not observed the first time, because there are many reasons why the dynamic target is not detected, which may be single error detection or temporary blocking of the target. In this case, if the dynamic target is deleted rashly, correctness, continuity, and robustness of the system will be affected.

Because there may be a high-speed flashing object and erroneous target detection, the dynamic target is added to an overall state vector only after the dynamic target is observed in a plurality of consecutive frames, to ensure correctness of adding the target.

In another possible implementation, the method further includes: if the target object in the moving state is not observed in the current frame within a preset time, deleting the predicted value of the current state vector of the target object from the Kalman state vector.

In an embodiment described in this disclosure, the system does not always retain information about the dynamic target in the state vector, because unnecessary calculation burden is caused in that case. To avoid increasing calculation burden, the dynamic target is deleted from the state vector and a covariance matrix is modified correspondingly only when the dynamic target cannot be tracked for a proper period of time. In a possible implementation, only a row and a column that correspond to the dynamic target need to be deleted.

According to a second aspect, a moving object tracking apparatus is provided. The apparatus includes a module configured to perform the method in the first aspect.

According to a third aspect, a moving object tracking apparatus is provided, including:

an obtaining module, configured to obtain a current frame captured by a camera;

a first prediction module, configured to predict a current state vector of the camera based on an inertial measurement unit IMU and the current frame, to obtain a predicted value of the current state vector of the camera, where the current state vector of the camera is used to indicate a current pose of the camera;

a second prediction module, configured to predict a current state vector of a target object that is moving in the current frame, to obtain a predicted value of the current state vector of the target object, where the current state vector of the target object is used to indicate a current pose of the target object;

a generation module, configured to generate a Kalman state vector based on the predicted value of the current state vector of the camera and the predicted value of the current state vector of the target object; and an update module, configured to update the Kalman state vector based on a measurement result of an image feature in the current frame, to obtain an updated Kalman state vector, where the updated Kalman state vector is used to indicate that the target object is tracked.

In a possible implementation, the apparatus further includes:

configured to calculate, a first calculation module, a Jacobian matrix of an image feature of the current frame based on an image feature of a background part in the current frame and an image feature of the target object; and the update module is configured to:

update, based on the Jacobian matrix of the image feature of the current frame, the predicted value of the current state vector of the target object and the predicted value of the current state vector of the camera that are included in the Kalman state vector.

In another possible implementation, the second prediction module is configured to:

determine a dynamic feature point in the current frame, where the dynamic feature point includes a representation point and a non-representation point, the representation point is used as an origin of a coordinate system of the target object, and the non-representation point is used to represent another dynamic feature point other than the representation point on the target object; and predict, based on an attitude of the representation point and the random motion model, the current state vector of the target object in the moving state in the current frame, to obtain the predicted value of the current state vector of the target object.

In another possible implementation, the apparatus further includes:

a second calculation module, configured to: when the representation point is blocked, calculate the attitude of the representation point by using an attitude of the non-representation point.

In another possible implementation, the second prediction module is configured to:

frame the target object in the moving state in the current frame by using a bounding box; and determine a feature point in the bounding box as the dynamic feature point.

In another possible implementation, the generation module is configured to:

when the target object in the moving state is observed in a plurality of frames of images before the current frame, add the predicted value of the current state vector of the target object to a sliding window, to generate the Kalman state vector, where the sliding window includes the predicted value of the current state vector of the camera.

In another possible implementation, the apparatus further includes:

a deletion module, configured to: if the target object in the moving state is not observed in the current frame within a preset time, delete the predicted value of the current state vector of the target object from the Kalman state vector.

According to a fourth aspect, a moving object tracking apparatus is provided. The apparatus includes: a memory, configured to store a program; and a processor, configured to execute the program stored in the memory. When the program stored in the memory is executed, the processor is configured to perform the method in the first aspect.

Optionally, the processor may be a general purpose processor, and may be implemented by hardware or software. When implemented by hardware, the processor may be a logical circuit, an integrated circuit, or the like. When implemented by software, the processor may be a general purpose processor, and is implemented by reading software code stored in the memory. The memory may be integrated into the processor, or may be located outside the processor, and exist independently.

The memory, the processor, and an input/output interface are connected by using an internal connection path. The memory is configured to store a program instruction. The processor is configured to execute the program instruction stored in the memory, to control the input/output interface 830 to receive input data and information, and output data such as an operation result.

It should be understood that, the processor in the embodiments of this disclosure may be a central processing unit (central processing unit, CPU), or may further be another general purpose processor, a digital signal processor (digital signal processor, DSP), an application specific integrated circuit (application specific integrated circuit, ASIC), a field programmable gate array (field programmable gate array, FPGA), or another programmable logical device, discrete gate or transistor logical device, discrete hardware component, or the like. The general purpose processor may be a microprocessor, or the processor may be any conventional processor or the like. Alternatively, the processor uses one or more integrated circuits, and is configured to execute a related program, to implement the technical solutions provided in the embodiments of this disclosure.

The memory may include a read-only memory and a random access memory, and provide an instruction and data to the processor. A part of the processor may further include a non-volatile random access memory. For example, the processor may further store information of a device type.

In an implementation process, steps in the foregoing methods can be implemented by using a hardware integrated logical circuit in the processor, or by using instructions in a form of software. The method of the communication disclosed with reference to the embodiments of this disclosure may be directly performed by a hardware processor, or may be performed by using a combination of hardware in the processor and a software module. A software module may be located in a mature storage medium in the art, such as a random access memory, a flash memory, a read-only memory, a programmable read-only memory, an electrically erasable programmable memory, or a register. The storage medium is located in the memory, and a processor reads information in the memory and completes the steps in the foregoing methods in combination with hardware of the processor.

Specifically, the processor obtains the stored instruction from the memory, and performs the following steps:

obtaining a current frame captured by a camera;

predicting a current state vector of the camera based on an inertial measurement unit IMU and the current frame, to obtain a predicted value of the current state vector of the camera, where the current state vector of the camera is used to indicate a current pose of the camera;

predicting a current state vector of a target object that is moving in the current frame, to obtain a predicted value of the current state vector of the target object, where the current state vector of the target object is used to indicate a current pose of the target object;

generating a Kalman state vector based on the predicted value of the current state vector of the camera and the predicted value of the current state vector of the target object; and updating the Kalman state vector based on a measurement result of an image feature in the current frame, to obtain an updated Kalman state vector, where the updated Kalman state vector is used to indicate that the target object is tracked.

In a possible implementation, a Jacobian matrix of the image feature of the current frame is calculated based on an image feature of a background part in the current frame and an image feature of the target object; and the predicted value of the current state vector of the target object and the predicted value of the current state vector of the camera that are included in the Kalman state vector are updated based on the Jacobian matrix of the image feature of the current frame.

In another possible implementation, a dynamic feature point in the current frame is determined, where the dynamic feature point includes a representation point and a non-representation point, the representation point is used as an origin of a coordinate system of the target object, and the non-representation point is used to represent another dynamic feature point other than the representation point on the target object; and the current state vector of the target object in the moving state in the current frame is predicted based on an attitude of the representation point and the random motion model, to obtain the predicted value of the current state vector of the target object.

In another possible implementation, when the representation point is blocked, the attitude of the representation point is calculated by using an attitude of the non-representation point.

In another possible implementation, the target object in the moving state in the current frame is framed by using a bounding box; and a feature point in the bounding box is determined as the dynamic feature point.

In another possible implementation, when the target object in the moving state is observed in a plurality of frames of images before the current frame, the predicted value of the current state vector of the target object is added to a sliding window, to generate the Kalman state vector, where the sliding window includes the predicted value of the current state vector of the camera.

In another possible implementation, if the target object in the moving state is not observed in the current frame within a preset time, the predicted value of the current state vector of the target object is deleted from the Kalman state vector.

According to a fifth aspect, a chip is provided. The chip includes: a memory, configured to store a program; and a processor, configured to execute the program stored in the memory. When the program stored in the memory is executed, the processor is configured to perform the method in the first aspect.

Optionally, the processor may be a general purpose processor, and may be implemented by hardware or software. When implemented by hardware, the processor may be a logical circuit, an integrated circuit, or the like. When implemented by software, the processor may be a general purpose processor, and is implemented by reading software code stored in the memory. The memory may be integrated into the processor, or may be located outside the processor, and exist independently.

The memory, the processor, and an input/output interface are connected by using an internal connection path. The memory is configured to store a program instruction. The processor is configured to execute the program instruction stored in the memory, to control the input/output interface 830 to receive input data and information, and output data such as an operation result.

It should be understood that, the processor in the embodiments of this disclosure may be a central processing unit (central processing unit, CPU), or may further be another general purpose processor, a digital signal processor (digital signal processor, DSP), an application specific integrated circuit (application specific integrated circuit, ASIC), a field programmable gate array (field programmable gate array, FPGA), or another programmable logical device, discrete gate or transistor logical device, discrete hardware component, or the like. The general purpose processor may be a microprocessor, or the processor may be any conventional processor or the like. Alternatively, the processor uses one or more integrated circuits, and is configured to execute a related program, to implement the technical solutions provided in the embodiments of this disclosure.

The memory may include a read-only memory and a random access memory, and provide an instruction and data to the processor. A part of the processor may further include a non-volatile random access memory. For example, the processor may further store information of a device type.

In an implementation process, steps in the foregoing methods can be implemented by using a hardware integrated logical circuit in the processor, or by using instructions in a form of software. The method of the communication disclosed with reference to the embodiments of this disclosure may be directly performed by a hardware processor, or may be performed by using a combination of hardware in the processor and a software module. A software module may be located in a mature storage medium in the art, such as a random access memory, a flash memory, a read-only memory, a programmable read-only memory, an electrically erasable programmable memory, or a register. The storage medium is located in the memory, and a processor reads information in the memory and completes the steps in the foregoing methods in combination with hardware of the processor.

Specifically, the processor obtains the stored instruction from the memory, and performs the following steps:

obtaining a current frame captured by a camera;

predicting a current state vector of the camera based on an inertial measurement unit IMU and the current frame, to obtain a predicted value of the current state vector of the camera, where the current state vector of the camera is used to indicate a current pose of the camera;

predicting a current state vector of a target object that is moving in the current frame, to obtain a predicted value of the current state vector of the target object, where the current state vector of the target object is used to indicate a current pose of the target object;

generating a Kalman state vector based on the predicted value of the current state vector of the camera and the predicted value of the current state vector of the target object; and updating the Kalman state vector based on a measurement result of an image feature in the current frame, to obtain an updated Kalman state vector, where the updated Kalman state vector is used to indicate that the target object is tracked.

In a possible implementation, a Jacobian matrix of the image feature of the current frame is calculated based on an image feature of a background part in the current frame and an image feature of the target object; and the predicted value of the current state vector of the target object and the predicted value of the current state vector of the camera that are included in the Kalman state vector are updated based on the Jacobian matrix of the image feature of the current frame.

In another possible implementation, a dynamic feature point in the current frame is determined, where the dynamic feature point includes a representation point and a non-representation point, the representation point is used as an origin of a coordinate system of the target object, and the non-representation point is used to represent another dynamic feature point other than the representation point on the target object; and the current state vector of the target object in the moving state in the current frame is predicted based on an attitude of the representation point and the random motion model, to obtain the predicted value of the current state vector of the target object.

In another possible implementation, when the representation point is blocked, the attitude of the representation point is calculated by using an attitude of the non-representation point.

In another possible implementation, the target object in the moving state in the current frame is framed by using a bounding box; and a feature point in the bounding box is determined as the dynamic feature point.

In another possible implementation, when the target object in the moving state is observed in a plurality of frames of images before the current frame, the predicted value of the current state vector of the target object is added to a sliding window, to generate the Kalman state vector, where the sliding window includes the predicted value of the current state vector of the camera.

In another possible implementation, if the target object in the moving state is not observed in the current frame within a preset time, the predicted value of the current state vector of the target object is deleted from the Kalman state vector.

According to a sixth aspect, a computer-readable medium is provided. The computer-readable medium stores program code executed by a device, and the program code includes an instruction used to perform the method in the first aspect.

According to a seventh aspect, a computer program product including an instruction is provided. When the computer program product is run on a computer, the computer is enabled to perform the method in the first aspect.

DESCRIPTION OF EMBODIMENTS

The following describes technical solutions of this disclosure with reference to accompanying drawings.

MSCKF is a multi-state constraint Kalman filter. The multi-state constraint means that camera poses of a plurality of frames of images are added to a Kalman state vector, and before a Kalman gain is performed, least square optimization is performed by using a constraint between the plurality of frames of images to estimate a spatial position of a feature point, and then a state vector is constrained based on the spatial position that is of the feature point and that is obtained after the optimization. The plurality of frames of images are stored in a sequence of sliding windows sorted by time, and coordinates of a plurality of feature points in the plurality of frames of images are tracked, to establish a constraint between poses of the frames of images. Another constraint is that there is a known constraint between a camera pose and an IMU pose at a same moment. This constraint is used in state augmentation. Under the two constraints, the Kalman filter can obtain a better estimate. This method has advantages of high robustness and low calculation complexity.

Figure 1:
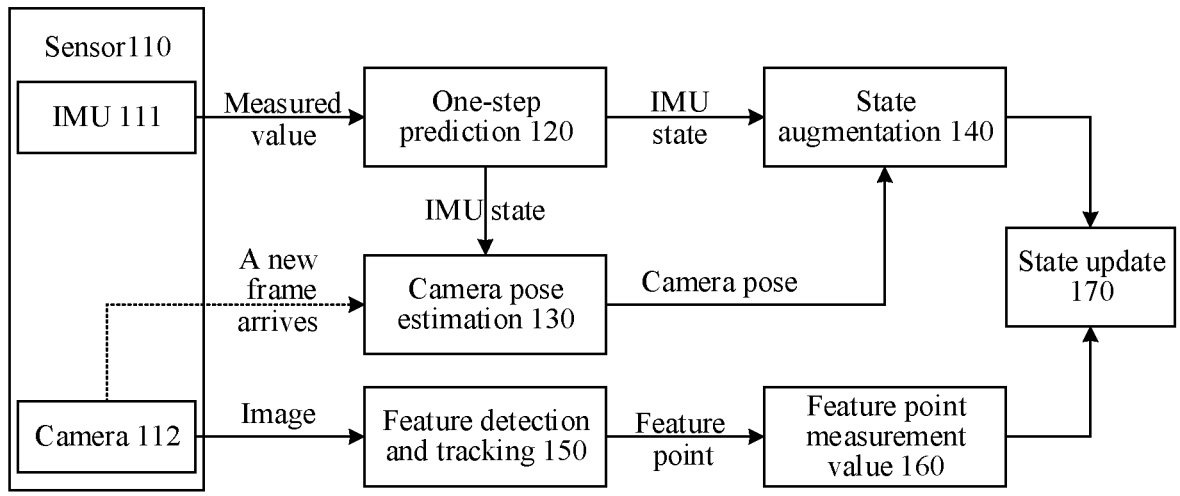
FIG. 1 is a schematic structural diagram of an MSCKF framework.

For ease of description, the following describes a framework of the MSCKF in detail with reference to FIG. 1.

FIG. 1 is a schematic structural diagram of an MSCKF framework. As shown in FIG. 1, the MSCKF framework may include: a sensor 110 (including an IMU 111 and a camera 112), a one-step prediction module 120, a camera pose estimation module 130, a state extension 140, a feature detection and tracking module 150, a feature point measurement value module 160, and a state update module 170. The following separately describes the modules in detail.

It should be noted that the camera 112 is not specifically limited in this embodiment of this disclosure, which may be a monocular camera, a binocular camera, or a multi-ocular camera.

(1) IMU 111:

The IMU 111 is an apparatus for measuring a three-axis attitude angle (or an angular rate) and acceleration of an object. Generally, one IMU includes three single-axis accelerometers and three single-axis gyroscopes. The accelerometers detect acceleration signals of an object on three independent axes of a coordinate system of a carrier. The gyroscopes detect signals of angular velocities of the carrier relative to a navigation coordinate system, to measure an angular velocity and acceleration of the object in a three-dimensional space, to calculate an attitude of the object.

In this embodiment of this disclosure, measured values output by the IMU 111 are respectively a measured value $\omega(t)$ of an angular velocity and a measured value $a(t)$ of acceleration. Because the IMU 111 sensor has a bias and noise, a true value $\hat{\omega}(t)$ of the angular velocity and the measured value $\omega(t)$ of the angular velocity are as shown in a formula (1), and a true value $\hat{a}(t)$ of the acceleration and the measured value $a(t)$ of the acceleration are as shown in a formula (2):

$$\omega(t)=\hat{\omega}(t)+b_g(t)+n_g(t) \quad (1)$$

$$a(t)=\hat{a}(t)+b_a(t)+n_a(t) \quad (2)$$

$b_g(t)$ is used to represent biases of gyroscopes.
$b_a(t)$ is used to represent biases of accelerometers.

$n_g(t)$ is used to represent noise of the gyroscopes, and complies with Gaussian distribution.

$n_a(t)$ is used to represent noise of the accelerometers, and complies with Gaussian distribution.

It should be noted that, the noise of the gyroscopes and the noise of the accelerometers are parameters of the IMU 111, and remain unchanged at a previous moment and a current moment.

(2) One-Step Prediction Module 120:

Because a data frequency of the IMU 111 is higher than a frequency of general image visual information, a plurality of groups of data output by the IMU 111 may be pre-integrated between two adjacent frames of images, to predict a state vector of the IMU 111 at a current moment based on a state vector of the IMU 111 at a previous moment, to obtain a predicted value of the state vector of the IMU 111 at the current moment.

The state vector of the IMU 111 may include parameters such as a current pose and an instantaneous speed. For details, refer to a formula (3):

$$X_{IMU} = \begin{bmatrix} {}^I_G\bar{q}^T & b_g^T & {}^Gv_I^T & b_a^T & {}^Gp_I^T \end{bmatrix} \quad (3)$$

$X_{IMU}$ is used to represent a state vector of the IMU 111.

${}^I_G\bar{q}$ is used to represent an attitude (or an orientation) of the IMU 111 in a global coordinate system (global, G), and q represents a quaternion.

${}^Gv_I$ is used to represent a speed of the IMU 111 in the global coordinate system G.

${}^Gp_I$ is used to represent a position vector of the IMU 111 in the global coordinate system G.

The IMU 111 may predict the state vector of the IMU 111 at the current moment based on the state vector of the IMU 111 at the previous moment. For details, refer to a formula (4):

$$X_{IMU,k|k-1} = X_{IMU,k-1|k-1} + \int_{t_{k-1}}^{t_k} \dot{\hat{X}}_{IMU}(t)dt \quad (4)$$

$X_{IMU,k|k-1}$ may be used to represent $X_{IMU}$ at a current moment (k) that is predicted based on updated $X_{IMU}$ at a previous moment (k−1).

$X_{IMU,k-1|k-1}$ is used to represent updated $X_{IMU}$ at the moment (k−1).

$\int_{t_{k-1}}^{t_k} \dot{\hat{X}}_{IMU}(t)dt$ is used to represent integrated $\dot{\hat{X}}_{IMU}(t)$ from the moment (k−1) to the moment (k).

$\dot{\hat{X}}_{IMU}(t)$ is used to represent a derivative of a true value of $X_{IMU}$.

$\dot{\hat{X}}_{IMU}(t)$ may be obtained by using a motion law shown in a formula (5):

$$\dot{\hat{X}}_{IMU}(t) = \begin{bmatrix} {}^I_G\dot{\hat{\bar{q}}} \\ \dot{\hat{b}}_g \\ {}^G\dot{\hat{v}}_I \\ \dot{\hat{b}}_a \\ {}^G\dot{\hat{p}}_I \end{bmatrix} = \begin{bmatrix} \frac{1}{2}\Omega(\hat{\omega}){}^I_G\hat{\bar{q}} \\ 0 \\ C({}^I_G\hat{\bar{q}})^T\hat{a} - 2\lfloor\omega_G\times\rfloor{}^G\hat{v}_I - \lfloor\omega_G\times\rfloor^{2\,G}\hat{p}_I + {}^Gg \\ 0 \\ {}^G\hat{v}_I \end{bmatrix} \quad (5)$$

${}^I_G\dot{\hat{\bar{q}}}$ is used to represent a derivative of a true value of ${}^I_G\bar{q}$.

${}^G\hat{v}_I$ is used to represent a derivative of a true value of ${}^Gv_I$.

${}^G\hat{p}_I$ is used to represent a derivative of a true value of ${}^Gp_I$.

$C({}^I_G\hat{\bar{q}})$ is used to represent a derivative of a true value of ${}^I_G\bar{q}$, and an operation of converting a quaternion into a matrix.

$\hat{b}_g$ is used to represent a derivative of a true value of $b_g$.

$\hat{b}_a$ is used to represent a derivative of a true value of $b_a$.

$\hat{a}$ is used to represent a true value of acceleration.

$\hat{\omega}$ is used to represent a true value of an angular velocity.

$\lfloor\omega_G\times\rfloor$ is used to represent an operation of converting a vector $\omega_G$ into an anti-symmetric matrix, and $\omega_G$ is used to represent an angular velocity of rotation of the earth.

It should be noted that, for an operation of converting a vector into an anti-symmetric matrix, for example, $$\hat{a} = \begin{bmatrix} a_1 \\ a_2 \\ a_3 \end{bmatrix} \text{ and } \lfloor\hat{a}\times\rfloor = \begin{bmatrix} 0 & -a_3 & a_2 \\ a_3 & 0 & -a_1 \\ -a_2 & a_1 & 0 \end{bmatrix}.$$

A definition of $\Omega(\omega)$ is shown in the following formula (6):

$$\Omega(\omega) = \begin{bmatrix} \lfloor\omega\times\rfloor & \omega \\ -\omega^T & 0 \end{bmatrix} \quad (6)$$

(3) Camera Pose Estimation Module 130:

The camera pose estimation module 130 is configured to: when a new frame arrives, determine a state vector $X_{CN}$ of the camera 112 at a current moment based on a predicted value $X_{IMU,k|k-1}$ of the state vector of the IMU 111 at the current moment.

(4) State Augmentation 140:

The state augmentation 140 is configured to: when a new frame arrives, add a state vector $X_{CN}^T$ of the camera 112 to a current overall state vector of a sliding window, to form a new overall state vector. For a specific state vector $X_{CN}{}^T$ of the camera 112, refer to a formula (7) to a formula (7-2):

$$X_{CN} = \begin{bmatrix} {}^{C_N}_G \bar{q}^T & {}^G p_{C_N}^T \end{bmatrix} {}^{C_N}_G \bar{q} \tag{7}$$

is used to represent an orientation of the camera 112 in the global coordinate system G at a current moment (a moment N). For calculation of a true value of $${}^{C_N}_G \bar{q},$$

refer to the formula (7-1).

${}^G p_{C_N}$ is used to represent a position vector of the camera 112 in the global coordinate system G at the current moment (the moment N). For calculation of a true value of ${}^G p_{C_N}$, refer to the formula (7-2).

$${}^{C_N}_G \hat{\bar{q}} = {}^{C_N}_I \bar{q} \otimes {}^I_G \hat{\bar{q}} \tag{7-1}$$

is used to represent an orientation between the camera 112 and the IMU 111.

$${}^I_G \hat{\bar{q}}$$

is used to represent a true value of an attitude (an orientation) of the IMU 111 in the global coordinate system G.

⊗ is used to represent quaternion multiplication.

$${}^G \hat{p}_{C_N} = {}^G \hat{p}_I + C({}^I_G \bar{q})^T {}^I p_{C_N} \tag{7-2}$$

${}^G p_I$ is used to represent a true value of a position of the IMU 111 in the global coordinate system G.

${}^I p_{C_N}$ is used to represent a position between the camera 112 and the IMU 111.

The state vector $X_{Ci}$ of the camera 112 at the current moment is added to the current overall state vector in the sliding window, to form a new overall state vector.

It should be noted that a transformation matrix J needs to be calculated after the state vector $X_{Ci}$ of the camera 112 at the current moment is added to the current overall state vector of the sliding window. A covariance matrix corresponding to the new overall state vector is calculated based on the transformation matrix J.

For modification of the covariance matrix corresponding to the overall state vector, refer to a description in a formula (8):

$$P_{k|k-1} \leftarrow \begin{bmatrix} I \\ J \end{bmatrix} P_{k|k-1} \begin{bmatrix} I \\ J \end{bmatrix}^T \tag{8}$$

A method for calculating J is shown in a formula (9):

$$J = \begin{bmatrix} C({}^C_I \bar{q}) & 0_{3\times 9} & 0 & 0 \\ -C({}^I_G \bar{q})^T \lfloor {}^I p_C \times \rfloor & 0_{3\times 9} & I & 0 \end{bmatrix} \tag{9}$$

The new overall state vector in the state augmentation 140 in this embodiment of this disclosure may be represented as follows:

$$X_k = [X_{IMU}{}^T X_{C1}{}^T \ldots X_{CN}{}^T]^T \tag{10}$$

$X_{IMU}$ represents a state vector of the IMU.

$X_{Ci}$ represents a state vector of the camera 112 at a moment i.

N is a quantity of moments for storing a pose of the camera 112 in a sliding window.

(5) Feature Detection and Tracking Module 150:

The feature detection and tracking module 150 is configured to obtain a feature point in an image captured by the camera 112.

It should be understood that, in image processing, the feature point is a point at which a grayscale value of the image drastically changes or a point at which a curvature is relatively large on an edge of the image (that is, an intersection point of two edges). The image feature point plays an important role in a feature point-based image matching algorithm. The image feature point can reflect an essential feature of the image, and can identify a target object in the image. Image matching can be completed through feature point matching.

In a possible implementation, the feature point in the image captured by the camera 112 may be extracted by using a FAST algorithm.

(6) Feature Point Measurement Value Module 160:

The feature point measurement value module 160 is configured to calculate a Jacobian matrix of an image feature, so that the state update module 170 updates an overall state vector $X_k$ and a covariance matrix at a current moment that are predicted by the one-step prediction module 120 in a formula (16).

(7) State Update Module 170:

The state update module 170 is configured to update an overall state vector $X_k$ and a covariance matrix at a current moment that are predicted by the one-step prediction module 120.

According to the moving object tracking method provided in this disclosure, an attitude of a target object that is moving can be estimated while an attitude of a system can be estimated. The following describes technical solutions provided in the embodiments of the present application in detail with reference to accompanying drawings.

Figure 2:
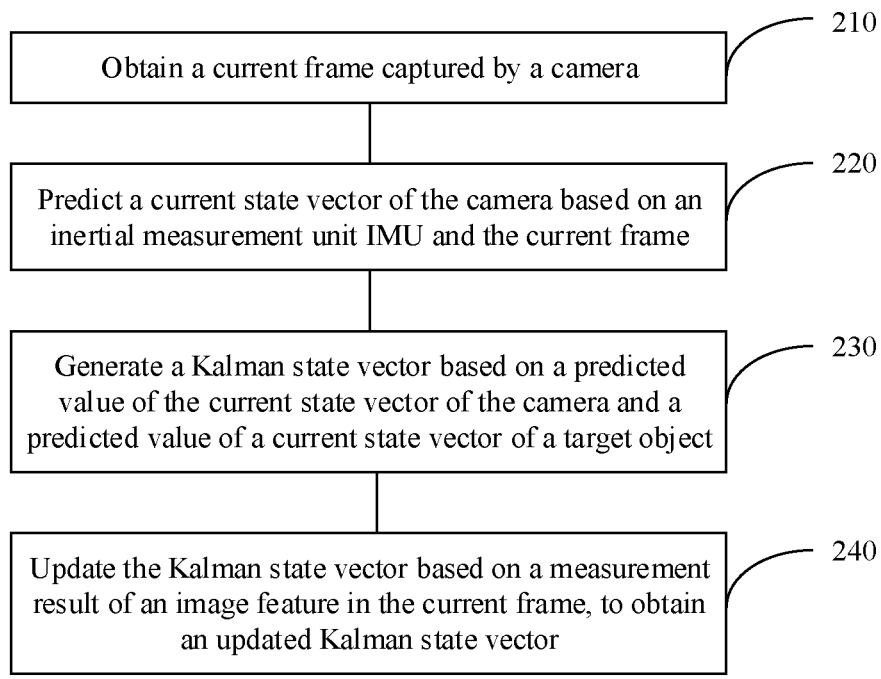
FIG. 2 is a schematic flowchart of a moving object tracking method according to an embodiment of this disclosure.

FIG. 2 is a schematic flowchart of a moving object tracking method according to an embodiment of this disclosure. As shown in FIG. 2, the method includes steps 210 to 240. The following separately describes steps 210 to 240 in detail.

Step 210: Obtain a current frame captured by a camera.

Step 220: Predict a current state vector of the camera based on an inertial measurement unit IMU and the current frame, to obtain a predicted value of the current state vector of the camera.

The current state vector of the camera is used to indicate a current pose of the camera.

Step 230: Generate a Kalman state vector based on the predicted value of the current state vector of the camera and the predicted value of the current state vector of the target object.

The Kalman state vector may correspond to the overall state vector described above. It should be understood that, in this embodiment of this disclosure, after a target object is detected, a state vector that is at a current moment and that is obtained through initialization of the newly observed target object may be added to an overall state vector, to form a new overall state vector.

Step 240: Update the Kalman state vector based on a measurement result of an image feature in the current frame, to obtain an updated Kalman state vector.

The updated Kalman state vector is used to indicate that the target object is tracked.

It should be noted that, this embodiment of this disclosure is equivalent to modules for predicting and updating a target object are added to the MSCKF framework shown in FIG. 1. The following describes, in detail with reference to FIG. 3, an MSCKF framework used to estimate an attitude of a system and an attitude of a target object that is moving in an embodiment of this disclosure.

Figure 3:
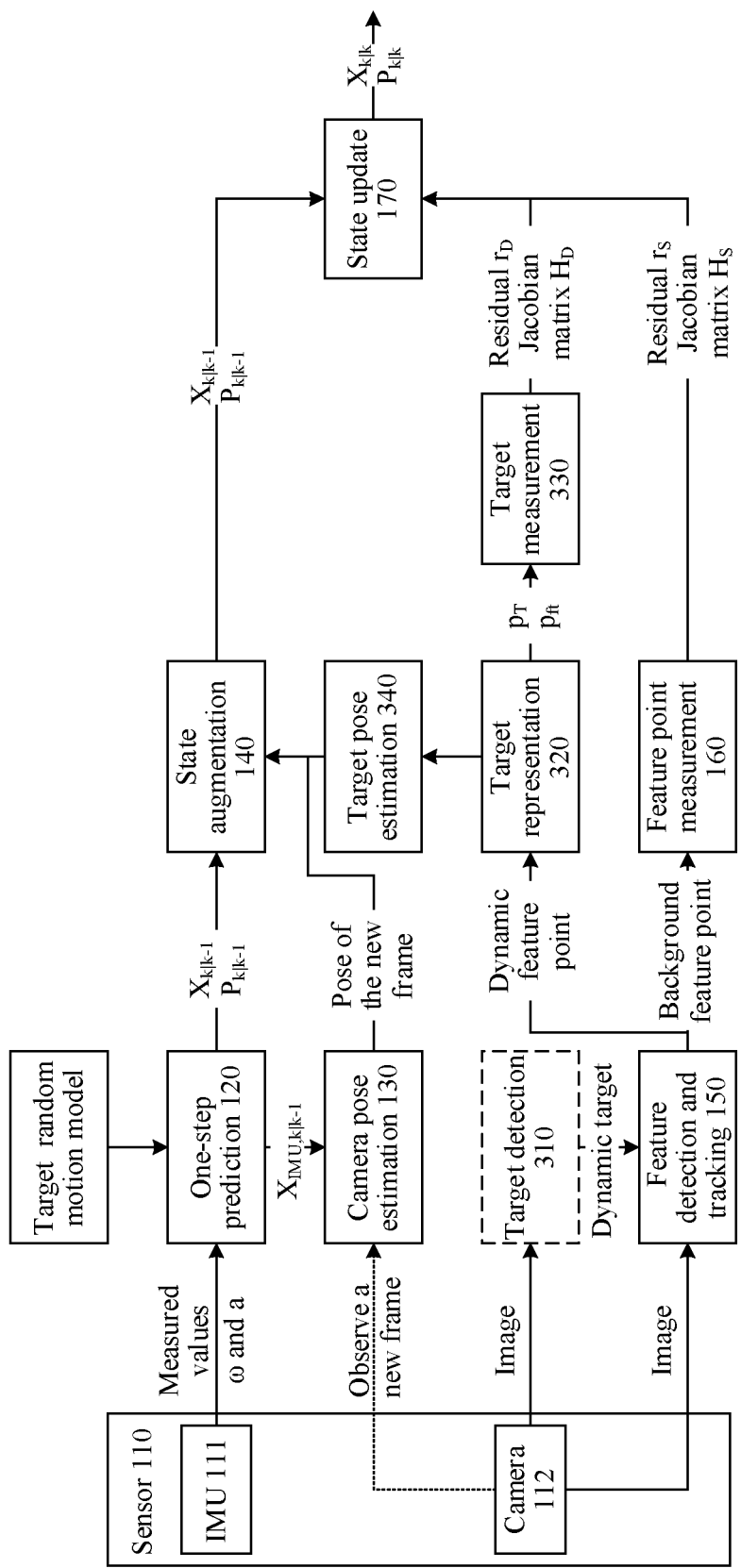
FIG. 3 is a schematic structural diagram of an MSCKF framework according to an embodiment of this disclosure.

FIG. 3 is a schematic structural diagram of an MSCKF framework according to an embodiment of this disclosure. As shown in FIG. 3, the MSCKF framework may include: a sensor 110 (including an IMU 111 and a camera 112), a one-step prediction module 120, a camera pose estimation module 130, a state augmentation 140, a feature detection and tracking module 150, a feature point measurement value module 160, a state update module 170, a target detection 310, a target representation 320, a target measurement 330, and a target pose estimation 340. The following separately describes the modules in detail.

(1) IMU 111:

Refer to the description of the IMU 111 in FIG. 1. Details are not described herein again.

(2) One-Step Prediction Module 120:

The one-step prediction module 120 may not only predict a state vector of the IMU 111 at a current moment based on a state vector of the IMU 111 at a previous moment, but also predict motion of a dynamic target by using a motion model and calculate a predicted value of a state vector of the dynamic target at the current moment. For details, refer to FIG. 4.

Figure 4:
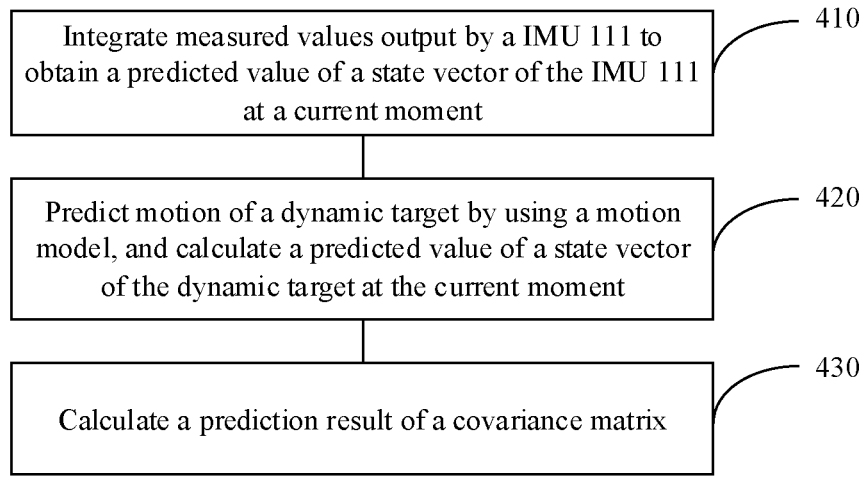
FIG. 4 is a schematic flowchart of predicting a state vector at a current moment according to an embodiment of this disclosure.

FIG. 4 is a schematic flowchart of predicting a state vector at a current moment according to an embodiment of this disclosure. The method shown in FIG. 4 may include steps 410 to 430. The following separately describes steps 410 to 430 in detail.

Step 410: Integrate measured values output by the IMU 111 to obtain a predicted value of a state vector of the IMU 111 at a current moment.

For details, refer to the description of the one-step prediction module 120 in FIG. 1. Details are not described herein again.

Step 420: Predict motion of a dynamic target by using a motion model, and calculate a predicted value of a state vector of the dynamic target at the current moment.

For target tracking with the MSCKF framework, a motion model of a dynamic target needs to be established. In different application scenarios, there are different dynamic targets, and different motion models may be established based on different motion modes of the targets. The motion models may be uniformly shown in a formula (11):

$$\dot{\tilde{X}}_T = F_T \tilde{X}_T G_T n_T \qquad (11)$$

$\dot{\tilde{X}}_T$ is used to represent a derivative of an error value of a state vector of a dynamic target.

$\tilde{X}_T$ is used to represent the error value of the state vector of the dynamic target.

Matrices $F_T$ and $G_T$ are related to a motion model. The following describes the matrices $F_T$ and $G_T$ with reference to a specific motion model.

This embodiment of this disclosure proposes three random motion models to model motion of a target. In actual application, a motion model needs to be properly selected based on different application scenarios, or another motion model needs to be used depending on a situation.

In this embodiment of this disclosure, a motion status of a dynamic target can be predicted in a short time.

In a possible implementation, the random motion model is a global uniform motion model. A speed and an angular velocity of a dynamic target in the model are considered as a random walk model. The model is applicable to a case in which a position and an orientation of the dynamic target are decoupled.

A state vector of the dynamic target may include parameters such as a current pose and an instantaneous speed. For details, refer to a formula (12):

$$X_T = [{}^T_G\bar{q}^T \quad {}^T\omega^T \quad {}^Gp_T^T \quad {}^Gv_T^T]^T \qquad (12)$$

$X_T$ is used to represent a state vector of a dynamic target.

${}^T_G\bar{q}$ is used to represent an attitude of the dynamic target in a global coordinate system (global, G), and q represents a quaternion.

${}^T\omega$ is used to represent an angular velocity of the dynamic target.

${}^Gp_T$ is used to represent a position vector of the dynamic target in the global coordinate system (global, G).

${}^Gv_T$ is used to represent a speed of the dynamic target in the global coordinate system (global, G).

A formula of a derivative of a true value of the state vector of the dynamic target is shown in a formula (13):

$$\dot{\hat{X}}_T(t) = \begin{bmatrix} {}^T_G\dot{\hat{q}} \\ {}^T\dot{\hat{\omega}} \\ {}^G\dot{\hat{p}}_T \\ {}^G\dot{\hat{v}}_T \end{bmatrix} = \begin{bmatrix} \frac{1}{2}\Omega({}^T\omega){}^T_G\hat{q} \\ 0 \\ {}^G\hat{v}_T \\ 0 \end{bmatrix} \qquad (13)$$

$\dot{\hat{X}}_T(t)$ is used to represent a derivative of a true value of a state vector of a dynamic target.

${}^T_G\dot{\hat{q}}$ is used to represent a derivative of a true value of an attitude of the dynamic target in the global coordinate system (global, G), and q represents a quaternion.

${}^T\dot{\hat{\omega}}$ is used to represent a derivative of a true value of an angular velocity of the dynamic target.

$^G\dot{\hat{p}}_T$ is used to represent a derivative of a true value of a position vector of the dynamic target in the global coordinate system (global, G).

$^G\dot{\hat{v}}_T$ is used to represent a derivative of a true value of a speed of the dynamic target in the global coordinate system (global, G).

$^G\hat{v}_T$ is used to represent the true value of the speed of the dynamic target in G.

$^T_G\hat{q}$ is used to represent me true value of the attitude of the dynamic target in G.

When the random motion model is the global uniform motion model, matrices $F_T$ and $G_T$ are respectively shown in a formula (13-1) and a formula (13-2):

$$F_T = \begin{bmatrix} -\lfloor^T\hat{\omega}\rfloor & I_3 & 0_3 & 0_3 \\ 0_3 & 0_3 & 0_3 & 0_3 \\ 0_3 & 0_3 & 0_3 & I_3 \\ 0_3 & 0_3 & 0_3 & 0_3 \end{bmatrix} \quad (13\text{-}1)$$

$$G_T = \begin{bmatrix} 0_3 & 0_3 \\ 0_3 & I_3 \\ 0_3 & 0_3 \\ I_3 & 0_3 \end{bmatrix} \quad (13\text{-}2)$$

In another possible implementation, the random motion model is a local uniform motion model. A speed of a dynamic target in the model is constant in a local coordinate system. The model is applicable to a ground robot or fixed-wing aircraft model.

For a state vector of the dynamic target, refer to a formula (14):

$$X_T = [^T_G\hat{q}^T \quad ^T\omega^T \quad ^Gp_T^T \quad ^Tv_T^T]^T \quad (14)$$

$^Tv_T$ is used to represent a speed of a dynamic target in the local coordinate system.

A derivative of a true value of the state vector of the dynamic target is shown in a formula (15):

$$\dot{\hat{X}}_T(t) = \begin{bmatrix} ^T_G\dot{\hat{q}} \\ ^T\dot{\hat{\omega}} \\ ^G\dot{\hat{p}}_T \\ ^T\dot{\hat{v}}_T \end{bmatrix} = \begin{bmatrix} \frac{1}{2}\Omega(^T\omega)^T_G\hat{q} \\ 0 \\ C(^T_G\hat{q})^T\hat{v}_T \\ 0 \end{bmatrix} \quad (15)$$

When the random motion model is the local uniform motion model, matrices $F_T$ and $G_T$ are respectively shown in a formula (15-1) and a formula (15-2):

$$F_T = \begin{bmatrix} -\lfloor^T\hat{\omega}\rfloor & I_3 & 0_3 & 0_3 \\ 0_3 & 0_3 & 0_3 & 0_3 \\ -^G_T\hat{R}\lfloor^T\hat{v}_T\rfloor & 0_3 & 0_3 & ^G_T\hat{R} \\ 0_3 & 0_3 & 0_3 & 0_3 \end{bmatrix} \quad (15\text{-}1)$$

-continued $$G_T = \begin{bmatrix} 0_3 & 0_3 \\ 0_3 & I_3 \\ 0_3 & 0_3 \\ I_3 & 0_3 \end{bmatrix} \quad (15\text{-}2)$$

In another possible implementation, the dynamic random motion model is a local plane motion model, and motion of a dynamic target in the model is constrained on a plane. In this model, noise is considered in plane estimation so that the model adapts to a plane constraint change.

For a state vector of the dynamic target, refer to a formula (16):

$$X_T = [^T_G\hat{q}^T \quad \omega_z \quad ^Gp_T^T \quad v_x \quad v_y]^T \quad (16)$$

$\omega_z$ is used to represent an angular velocity component in a z direction in a local coordinate system.

$v_x$ is used to represent a speed component in an x direction in the local coordinate system.

$v_y$ is used to represent a speed component in a Y direction in the local coordinate system.

A formula of a derivative of a true value of the state vector of the dynamic target is shown in a formula (17):

$$\dot{\hat{X}}_T(t) = \begin{bmatrix} ^T_G\dot{\hat{q}} \\ \dot{\hat{\omega}}_z \\ ^G\dot{\hat{p}}_T \\ \dot{\hat{v}}_x \\ \dot{\hat{v}}_y \end{bmatrix} = \begin{bmatrix} \frac{1}{2}\Omega\left(\begin{bmatrix} 0 \\ 0 \\ \hat{\omega}_z \end{bmatrix}\right)^T_G\hat{q} \\ 0 \\ C(^T_G\hat{q})^T\begin{bmatrix} \hat{v}_x \\ \hat{v}_y \\ 0 \end{bmatrix} \\ 0 \\ 0 \end{bmatrix} \quad (17)$$

When the random motion model is the local plane motion model, matrices $F_T$ and $G_T$ are respectively shown in a formula (17-1) and a formula (17-2):

$$F_T = \begin{bmatrix} -\lfloor^T\hat{\omega}\rfloor & e_3 & 0_3 & 0_{3\times 2} \\ 0_3 & 0_{3\times 1} & 0_3 & 0_{3\times 2} \\ -^G_T\hat{R}\lfloor^T\hat{v}_T\rfloor & 0_{3\times 2} & 0_3 & -^G_T\hat{R}[e_1 \ e_2] \\ 0_{2\times 2} & 0_{2\times 1} & 0_{2\times 3} & 0_{2\times 2} \end{bmatrix} \quad (17\text{-}1)$$

$$G_T = \begin{bmatrix} 0_3 & I_{12} \\ 0_{1\times 3} & I_3 \\ ^G_T\hat{R}K & 0_3 \\ J & 0_{2\times 3} \end{bmatrix} \quad (17\text{-}2)$$

$$I_{12} = \begin{bmatrix} 1 & 0 & 0 \\ 0 & 1 & 0 \\ 0 & 0 & 0 \end{bmatrix}, K = \begin{bmatrix} 1 & 0 & 0 \\ 0 & 0 & 0 \\ 0 & 0 & 0 \end{bmatrix}, \text{ and}$$

$$J = \begin{bmatrix} 1 & 0 & 0 \\ 0 & 1 & 0 \end{bmatrix}.$$

The dynamic target may predict a state vector of the dynamic target at a current moment based on a state vector of the dynamic target at a previous moment. For details, refer to a formula (18):

$$X_{T,k|k-1} = X_{T,k-1|k-1} + \int_{t_{k-1}}^{t_k} \hat{\dot{X}}_T(t)dt \quad (18)$$

$X_{T,k|k-1}$ may be used to represent $X_T$ at a current moment (k) that is predicted based on updated $X_T$ at a previous moment (k−1).

$X_{T,k-1|k-1}$ is used to represent updated $X_T$ at the moment (k−1).

$$\int_{t_{k-1}}^{t_k} \hat{\dot{X}}_T(t)dt$$

is used to represent integrated $\hat{\dot{X}}_T(t)$ from the moment (k−1) to the moment (k).

$\hat{\dot{X}}_T(t)$ is used to represent a derivative of a true value of X.

Different motion models correspond to different $\hat{\dot{X}}_T(t)$. For details, refer to the formulas (13), (15), and (17).

In this embodiment of this disclosure, the overall state vector at the current moment that is predicted by the one-step prediction module 120 may be represented as follows:

$$X_k = [X_{IMU}{}^T X_{T1}{}^T \ldots X_{TM}{}^T X_{C1}{}^T \ldots X_{CN}{}^T]^T \quad (19)$$

$X_{IMU}$ represents a state vector of the IMU.

$X_{Ci}$ represents a state vector of the camera 112 at a moment i.

$X_{Tj}$ represents a state vector of a $j^{th}$ dynamic target.

N is a quantity of moments for storing a pose of the camera 112 in a sliding window.

M is a quantity of dynamic targets that are being tracked.

It should be noted that the overall state vector may also be referred to as a Kalman state vector.

Step 430: Calculate a prediction result of a covariance matrix.

When calculating the state vector at the current moment based on the state vector at the previous moment, the one-step prediction module 120 may further predict a covariance matrix at the current moment based on a covariance matrix at the previous moment.

A covariance matrix of an overall system state vector at the previous moment is shown in a formula (20):

$$P_{k-1|k-1} = \begin{bmatrix} P_{II,k-1|k-1} & P_{IT,k-1|k-1} & P_{IC,k-1|k-1} \\ P_{IT,k-1|k-1}^T & P_{TT,k-1|k-1} & P_{TC,k-1|k-1} \\ P_{IC,k-1|k-1}^T & P_{TC,k-1|k-1}^T & P_{TT,k-1|k-1} \end{bmatrix} \quad (20)$$

$P_{k-1|k-1}$ is used to represent an updated covariance matrix at a previous moment (k−1).

$P_{II,k-1|k-1}$ is used to represent an updated covariance matrix between IMUs 111 at the previous moment (k−1).

$P_{IT,k-1|k-1}$ is used to represent an updated covariance matrix between the IMU 111 and a dynamic target at the previous moment (k−1).

$P_{IC,k-1|k-1}$ is used to represent an updated covariance matrix between the IMU 111 and the camera 112 at the previous moment (k−1).

$P_{IT,k-1|k-1}$ is used to represent an updated covariance matrix between the IMU 111 and a dynamic target at the previous moment (k−1).

$P_{TT,k-1|k-1}$ is used to represent an updated covariance matrix between dynamic targets at the previous moment (k−1).

$P_{TC,k-1|k-1}$ is used to represent an updated covariance matrix between the dynamic target and the camera 112 at the previous moment (k−1).

A covariance matrix of an overall system state vector at a current moment (k) is shown below.

$$P_{k|k-1} = \begin{bmatrix} P_{II,k|k-1} & P_{IT,k|k-1} & \Phi_I(t_{k-1}+T, t_{k-1})P_{IC,k-1|k-1} \\ P_{IT,k|k-1}^T & P_{TT,k|k-1} & \Phi_T(t_{k-1}+T, t_k)P_{TC,k-1|k-1} \\ P_{IC,k-1|k-1}^T \Phi_I(t_{k-1}+T, t_{k-1})^T & P_{TC,k-1|k-1}^T \Phi_T(t_{k-1}+T, t_{k-1})^T & P_{CC,k-1|k-1} \end{bmatrix}$$

$P_{k|k-1}$ is used to represent a covariance matrix at the current moment (k) that is predicted based on updated $P_{k-1|k-1}$ at the previous moment (k−1).

$P_{II,k|k-1}$ is used to represent a covariance matrix that is between the IMUs 111 at the current moment (k) and that is predicted based on updated $P_{II,k-1|k-1}$ at the previous moment (k−1).

$P_{IT,k|k-1}$ is used to represent a covariance matrix that is between the IMU 111 and the dynamic target at the current moment (k) and that is predicted based on updated $P_{IT,k-1|k-1}$ at the previous moment (k−1).

$P_{TT,k|k-1}$ is used to represent a covariance matrix that is between the dynamic targets at the current moment (k) and that is predicted based on updated $P_{TT,k-1|k-1}$ at the previous moment (k−1).

$P_{CC,k-1|k-1}$ is used to represent an updated covariance matrix between cameras 112 at the previous moment (k−1).

Φ is a state transition matrix, and meets a relationship shown in a formula (21) and a formula (22):

$$\dot{\Phi}_I(t,t_k) = F(t)\Phi_I(t,t_k) \quad (21)$$

$$\dot{\Phi}(t,t_k) = F_T(t)\Phi_T(t,t_k) \quad (22)$$

$P_{II,k|k-1}$, $P_{IT,k|k-1}$, and $P_{TT,k|k-1}$ may be calculated through numerical integration by using the following formula (23) to formula (25):

$$\dot{P}_{II} = FP_{II} + P_{II}F^T + GQ_{IMU}G^T \quad (23)$$

$$\dot{P}_{TT} = F_T P_{TT} + P_{TT}F_T^T + G_T Q_T G_T^T \quad (24)$$

$$\dot{P}_{IT} = FP_{IT}P_{IT}F_T^T \quad (25)$$

$Q_{IMU}$ and $Q_T$ are covariance matrices corresponding to noise $n_{IMU}$ and $n_T$.

A matrix F is shown in a formula (26), and a matrix G is shown in a formula (27):

$$F = \begin{bmatrix} -\lfloor \omega \times \rfloor & -I_3 & 0_{3\times3} & 0_{3\times3} & 0_{3\times3} \\ 0_{3\times3} & 0_{3\times3} & 0_{3\times3} & 0_{3\times3} & 0_{3\times3} \\ -C(_G^I\hat{q})^T \lfloor \hat{a} \times \rfloor & 0_{3\times3} & -2\lfloor \omega_G \times \rfloor & -C(_G^I\hat{q})^T & -\lfloor \omega_G \times \rfloor^2 \\ 0_{3\times3} & 0_{3\times3} & 0_{3\times3} & 0_{3\times3} & 0_{3\times3} \\ 0_{3\times3} & 0_{3\times3} & -I_3 & 0_{3\times3} & 0_{3\times3} \end{bmatrix} \quad (26)$$

$I_3$ is used to represent a unit matrix of 3×3.
$0_{3\times3}$ is used to represent a zero matrix of 3×3.
$\lfloor \hat{a} \times \rfloor$ is used to represent an operation of converting a vector into an anti-symmetric matrix, and $\hat{a}$ is used to represent a true value of acceleration.

$$G = \begin{bmatrix} -I_3 & 0_{3\times3} & 0_{3\times3} & 0_{3\times3} \\ 0_{3\times3} & I_3 & 0_{3\times3} & 0_{3\times3} \\ 0_{3\times3} & 0_{3\times3} & -C({}^I_G\hat{q})^T & 0_{3\times3} \\ 0_{3\times3} & 0_{3\times3} & 0_{3\times3} & I_3 \\ 0_{3\times3} & 0_{3\times3} & 0_{3\times3} & 0_{3\times3} \end{bmatrix} \quad (27)$$

(3) Camera Pose Estimation Module 130:

The camera pose estimation module 130 is configured to: when a new frame arrives, determine a state vector $X_{CN}$ of the camera 112 at a current moment based on a predicted value $X_{IMU,k|k-1}$ of the state vector of the IMU 111 at the current moment, and add the state vector $X_{CN}$ to a sliding window. Refer to the description of the camera pose estimation module 130 in FIG. 1. Details are not described herein again.

(4) State Augmentation 140:

Refer to the description of the state augmentation 140 in FIG. 1. Details are not described herein again.

(5) Feature Detection and Tracking Module 150:

The feature detection and tracking module 150 may classify feature points in an image to obtain a dynamic feature point and a static feature point (background feature point). For details, refer to FIG. 5.

Figure 5:
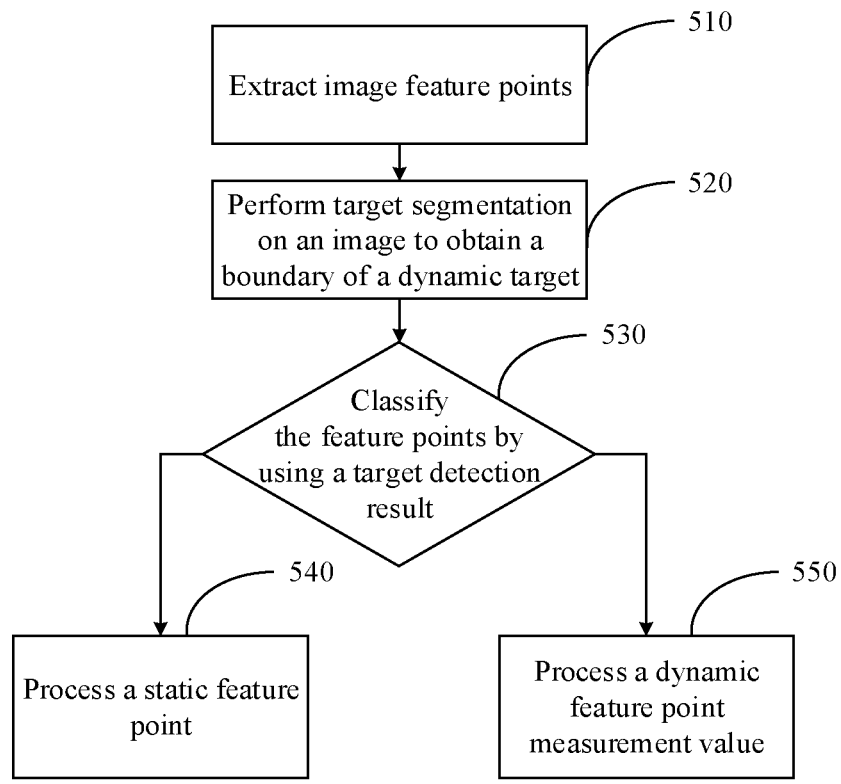
FIG. 5 is another schematic flowchart of predicting a state vector at a current moment according to an embodiment of this disclosure.

FIG. 5 is another schematic flowchart of predicting a state vector at a current moment according to an embodiment of this disclosure. The method shown in FIG. 5 may include steps 510 to 550. The following separately describes steps 510 to 550 in detail.

Step 510: Extract image feature points.

The feature points are extracted by using a FAST algorithm. In an actual scenario, feature points are usually unevenly distributed. To obtain feature points distributed as evenly as possible in an image, the image is segmented into grids, and the feature points are extracted evenly in the image grids.

Step 520: Perform target segmentation on the image to obtain a boundary of a dynamic target.

There are two types of target segmentation algorithms. One type is to frame a target by using a bounding box, and the other type is to perform segmentation at a pixel-level precision for a target. A segmentation precision of the first-type method is obviously lower than that of the second-type method, but a calculation amount of the second-type method is relatively large. Considering a real-time requirement, in this disclosure, the first-type method is used to perform target segmentation.

Step 530: Classify the feature points by using a target detection result.

The bounding box is used to classify the extracted feature points. The target detection 310 determines, as a dynamic feature point, a feature point that is within the bounding box and that is located on the dynamic target; and determines, as static feature point, a feature point that is within the bounding box and that belongs to static background.

(6) Feature Point Measurement Value Module 160:

The feature point measurement value module 160 is configured to process a static feature point. For details, refer to step 540 in FIG. 5.

Step 540: Process a static feature point.

When a feature point is lost or a maximum quantity of tracking points is reached, data of the feature point is used to update a state vector:

$$z_{fs}^{(i)} = \Pi({}^C p_{fs}^{(i)}) + n_{fs} \quad (28)$$

$$^C p_{fs}^{(i)} = C({}^C_G\bar{q})({}^G p_{fs}^{(i)} - {}^G p_C) \quad (29)$$

$\Pi$ is a projection function for projecting a feature point in a three-dimensional space onto a planar image, and i is a number of a dynamic target.

Residual equations of the feature point are as follows:

$$r_{fs}^{(i)} \approx H_X \tilde{X} + H_{fs} {}^C \tilde{p}_{fs}^{(i)} + n_{fs} \quad (30)$$

$$H_X^{(i)} = \begin{bmatrix} 0 & \dots & J^{(i)} \lfloor {}^C p_{fs}^{(i)} \times \rfloor & -J^{(i)} C({}^C_G \hat{q}) & \dots \end{bmatrix} \quad (31)$$

$$H_{fs}^{(i)} = J^{(i)} C({}^C_G \hat{q}) \quad (32)$$

$J^{(i)}$ and ${}^C \hat{p}_{fs}^{(i)}$ are shown in formulas (33) and (34):

$$J^{(i)} = \frac{1}{{}^C \hat{Z}^{(i)}} \begin{bmatrix} 1 & 0 & -\frac{{}^C \hat{X}^{(i)}}{{}^C \hat{Z}^{(i)}} \\ 0 & 1 & -\frac{{}^C \hat{Y}^{(i)}}{{}^C \hat{Z}^{(i)}} \end{bmatrix} \quad (33)$$

$$^C \hat{p}_{fs}^{(i)} = \begin{bmatrix} {}^C \hat{X}^{(i)} \\ {}^C \hat{Y}^{(i)} \\ {}^C \hat{Z}^{(i)} \end{bmatrix} \quad (34)$$

To remove impact of ${}^C \tilde{p}_{fs}^{(i)}$ in the residual equation, in this embodiment of this disclosure, the residual equation is projected to a left null space of $H_{fs}$. Assuming that N is a unitary matrix including a group of bases in the left zero space of $H_{fs}$, $N^T H_{fs}=0$. Left and right ends of the residual equation are both left-multiplied by $N^T$ to obtain a formula 0:

$$N^T r_{fs}^{(i)} \approx N^T H_X \tilde{X} + N^T n_{fs} \quad (35)$$

A residual $r_S$ is denoted as a formula (36):

$$r_S \approx H_S \tilde{X} + n_S \quad (36)$$

$H_S$ is used to represent a Jacobian matrix.

(7) Target Representation 320:

The target representation 320 is used to represent a dynamic target by using a dynamic feature point in an image. Refer to a description of processing a dynamic point measurement value in step 550. For a specific implementation of processing a dynamic point measurement value, refer to a method described in FIG. 6.

Figure 6:
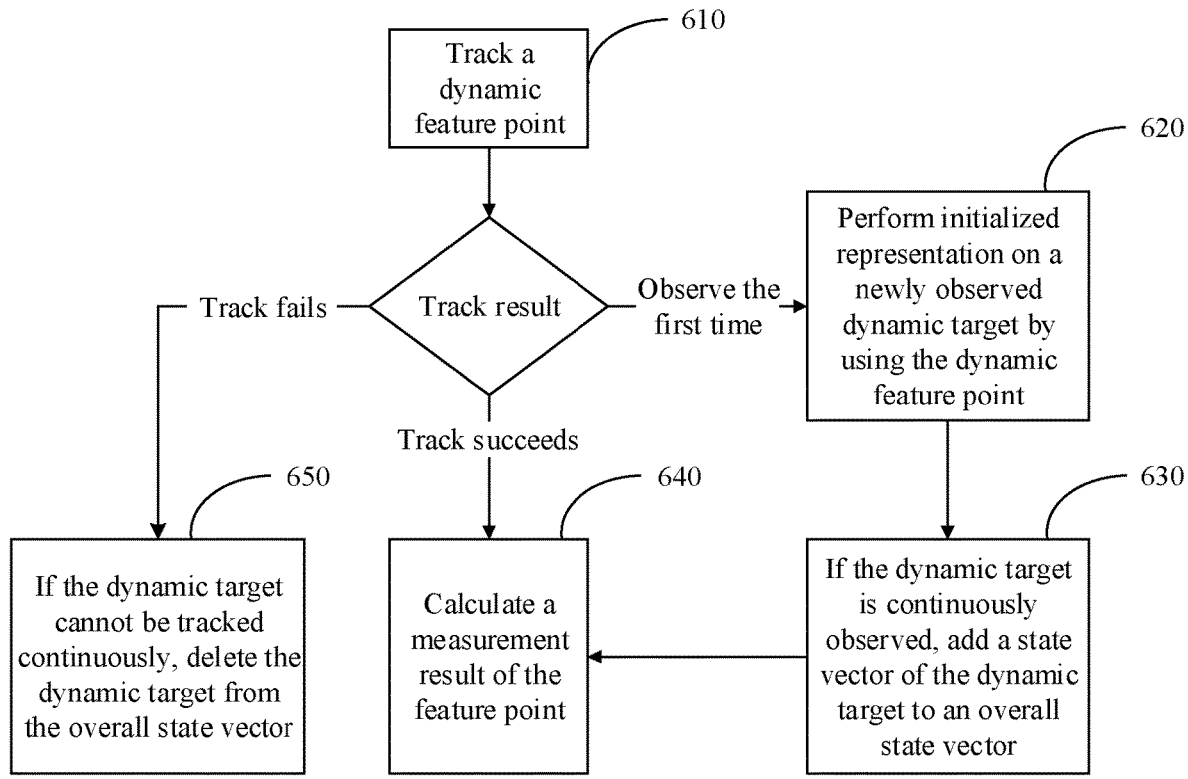
FIG. 6 is another schematic flowchart of predicting a state vector at a current moment according to an embodiment of this disclosure.

FIG. 6 is another schematic flowchart of predicting a state vector at a current moment according to an embodiment of this disclosure. The method shown in FIG. 6 may include steps 610 to 650. The following separately describes steps 610 to 650 in detail.

Step 610: Track a dynamic feature point.

In this embodiment of this disclosure, the feature point is tracked by using a KLT algorithm, to respectively perform left-eye inter-frame matching, right-eye inter-frame matching, and stereo matching.

Step 620: Observe the dynamic feature point the first time.

For a dynamic target observed the first time, it is necessary to determine a parameter needed for a complete description of motion of a rigid body. In this disclosure, the dynamic target is initialized by using dynamic feature points on a surface of the dynamic target, and the feature points are classified into a "representation point" and a "non-representation point" to represent the dynamic target.

In this embodiment of this disclosure, the initialization of the dynamic target can improve correctness of adding the dynamic target to a system state vector, and improve system robustness.

In this disclosure, it is assumed that a to-be-tracked target is a rigid body. In other words, the target does not deform in a moving process. Generally, 6 degrees of freedom may be used to describe a pose of the rigid body. A typical representation manner is to use a feature point (representation point) on the rigid body and a direction to represent the pose of the rigid body. However, when the representation point is blocked in the moving process of the target so that the representation point cannot be observed, this representation method is invalid, although an unblocked part of the rigid body can still be observed.

In this disclosure, a group of feature points rather than a single feature point on the surface of the dynamic target are used to represent the dynamic target. To clearly indicate a position of the rigid body, a "representation point" is required, and a position of the "representation point" in a global coordinate system is denoted as $^{G}p_T$. All observed feature points on the rigid body are "non-representation points", except for the "representation point". Because a single "representation point" cannot represent a 6-degree-of-freedom pose of the rigid body, a "non-representation point" needs to be used as an auxiliary "representation point" to represent the pose of the rigid body. A coordinate of the "non-representation point" in a coordinate system of the rigid body is denoted as $^{T}p_{ft}$.

According to a property of the rigid body, a relative position relationship between these feature points does not change with motion of the rigid body. In other words, positions of these feature points in a coordinate system that is static relative to the rigid body do not change. Therefore, $^{T}p_{ft}$ is a constant that does not change with time. In such a representation method, even if the dynamic target is partially blocked, a position of the representation point can still be calculated and the rigid body can still be successfully tracked provided that some feature points of the dynamic target can be observed.

A feasible solution for selecting a "representation point" and a "non-representation point" is to use a representation point (one of representation points) observed the first time as a "representation point" of a rigid body.

In this embodiment of this disclosure, the method is applicable to a case in which a dynamic target is partially blocked, and system robustness can be improved.

(8) Target Pose Estimation 340:

The target pose estimation 340 may determine, based on a position $^{G}p_T$ that is output by the target representation 320 and that is of a representation point in a global coordinate system and a coordinate $^{T}p_{ft}$ that is output by the target representation 320 and that is of a non-representation point in a coordinate system of a rigid body, whether a new dynamic target is observed. If a dynamic target is newly observed, a state vector of the dynamic target at a current moment is added to the overall state vector shown in the formula (19). For details, refer to the method described in FIG. 6.

Step 630: If the dynamic target is continuously observed, add a state vector of the dynamic target to an overall state vector.

Because there may be a high-speed flashing object and erroneous target detection, the dynamic target is added to an overall state vector only after the dynamic target is observed in a plurality of consecutive frames, to ensure correctness of adding the target.

It is assumed that a dynamic target is observed in frames $C_j$ to $C_N$, and $j \in [1,N]$. Triangulation is performed on feature points on the observed target, to obtain positions $$^{C_j}p_T$$

and $$^{C_j}p_{ft}^{(i)}$$

of a representation point and an $i^{th}$ non-representation point in a $C_j$ coordinate system. A state vector of the dynamic target is initialized based on observation of the dynamic target in the frames.

In this embodiment of this disclosure, a system may continuously update state vectors (including poses of a dynamic target and the system) by using a new observation result, to ensure that an algorithm tracks and locates the system and the dynamic target in a dynamic unknown environment.

The following provides initialization results of different random models.

In some embodiments, a running model is a global uniform motion model. A direction of a coordinate system of an $N^{th}$ frame (a current frame) is selected as an initial direction of a dynamic target, as shown in formulas (37) and (38):

$$^{T}_{G}\bar{q} = {}^{C_N}_{G}\bar{q} \quad (37)$$

$$^{T}\omega = \frac{-\lfloor {}^{C_N}e_{ft} \times \rfloor C\left({}^{C_N}_{G}\bar{q}\right) C\left({}^{C_j}_{G}\bar{q}\right)^{T} {}^{C_j}e_{ft}^{(i)}}{t_N - t_j} \quad (38)$$

$$^{C_j}e_{ft}^{(i)} = \frac{{}^{C_j}p_{ft}^{(i)} - {}^{C_j}p_T}{\|{}^{C_j}p_{ft}^{(i)} - {}^{C_j}p_T\|}$$

is a unit vector in a direction of a representation point pointing to an $i^{th}$ non-representation point in a Cj coordinate system.

$t_j$ is a time of a $j^{th}$ frame.

$$^{G}v_T = \frac{{}^{G}p_{T,N} - {}^{G}p_{T,j}}{t_N - t_j} \quad (39)$$

$$^{G}p_{T,j} = C\left({}^{C_j}_{G}\bar{q}\right)^{T} {}^{C_j}p_T + {}^{G}p_{C_j} \quad (40)$$

$$^{G}p_T = {}^{G}p_{T,N} = C\left({}^{C_N}_{G}\bar{q}\right)^{T} {}^{C_N}p_T + {}^{G}p_{C_N} \quad (41)$$

In some embodiments, a running model is a local uniform motion model, only representation of a speed is different from that in the previous model, and other variables are the same. $^{T}v_T$ is shown in a formula (42):

$$T_{v_T} = \frac{T_{p_{T,N}} - T_{p_{T,j}}}{t_N - t_j} \quad (42)$$

In the formula, $$T_{p_{T,j}} = C\left(^{C_N}_G \bar{q}\right)\left(^G p_{T,j} - ^G p_{C_j}\right) \quad (43)$$

$$T_{p_{T,N}} = ^{C_N} p_{T,N} \quad (44)$$

In some embodiments, a running model is a local plane motion model, and calculation of related parameters is shown in formulas (45) to (53):

$$G_\omega = C\left(^{C_N}_G \bar{q}\right) \frac{-\lfloor ^{C_N} e_{ft} \times \rfloor C\left(^{C_N}_G \bar{q}\right) C\left(^{C_j}_G \bar{q}\right)^T C_j e_{ft}^{(i)}}{t_N - t_j} \quad (45)$$

$$\omega_z = \|^G \omega\| \quad (46)$$

$$^T_G e_z = \frac{^G \omega}{\|^G \omega\|} \quad (47)$$

$$G_{v_T} = \frac{^G p_T^{(N)} - ^G p_T^{(j)}}{t_N - t_j} \quad (48)$$

$$v_x = \|^G v_T - ^G v_T \cdot ^T_G e_z\| \quad (49)$$

$$^T_G e_x = \frac{^G v_T - ^G v_T \cdot ^T_G e_z}{\|^G v_T - ^G v_T \cdot ^T_G e_z\|} \quad (50)$$

$$^T_G e_y = \lfloor ^T_G e_z \times \rfloor ^T_G e_x \quad (51)$$

$$v_y = 0 \quad (52)$$

$$C\left(^{C_N}_G \bar{q}\right) = \begin{bmatrix} ^T_G e_x & ^T_G e_y & ^T_G e_z \end{bmatrix} \quad (53)$$

$$^T_G e_i$$

represents a direction vector (i=x, y, z) of a coordinate axis in a T coordinate system.

$$^G p_T = C\left(^{C_N}_G \bar{q}\right)^T {^{C_N} p_T} + ^G p_{C_N} \quad (54)$$

It should be noted that, in this embodiment of this disclosure, because an error in a triangulation step depends on a specific used method, it is difficult to obtain a closed-form solution based on a covariance of an initialization result of a dynamic target. Therefore, it may be considered that an empirical value is set for a covariance matrix as an initial value, and the covariance is continuously corrected in a subsequent update process.

(9) Target Measurement 330:

The target measurement 330 is configured to process a dynamic feature point. For details, refer to step 640 in FIG. 6.

Step 640: Calculate a measurement result.

When dynamic targets are lost or a maximum tracking length is reached, a state vector is updated based on their measurement results.

In this disclosure, measurement results of all feature points, including a "representation point" and a "non-representation point", on a target detected in an image are collected and used. A measurement model of the representation point is as follows:

$$z_T^{(i)} = \Pi(^C p_T^{(i)}) + n_T \quad (55)$$

$$^C p_T^{(i)} = C(^C_G \bar{q})(^G p_T^{(i)} - ^G p_C) \quad (56)$$

$\Pi$ is a projection function for projecting a feature point in a three-dimensional space onto a planar image, and i is a number of a dynamic target.

Residual equations of the feature point are as follows:

$$r_T^{(i)} \approx H_X^{(i)} \tilde{X} + H_T {^C \tilde{p}_T^{(i)}} + n_T \quad (57)$$

$$H_X^{(i)} = \begin{bmatrix} 0 & \dots & J^{(i)} \lfloor ^C p_T^{(i)} \times \rfloor & -J^{(i)} C(^C_G \bar{q}) & \dots \end{bmatrix} \quad (58)$$

$$H_T^{(i)} = J^{(i)} C(^C_G \bar{q}) \quad (59)$$

In the formula, $$J^{(i)} = \frac{1}{^C \hat{Z}^{(i)}} \begin{bmatrix} 1 & 0 & -\frac{^C \hat{X}^{(i)}}{^C \hat{Z}^{(i)}} \\ 0 & 1 & -\frac{^C \hat{Y}^{(i)}}{^C \hat{Z}^{(i)}} \end{bmatrix} \quad (60)$$

$$^C p_T^{(i)} = \begin{bmatrix} ^C \hat{X}^{(i)} \\ ^C \hat{Y}^{(i)} \\ ^C \hat{Z}^{(i)} \end{bmatrix} \quad (61)$$

A measurement model of the non-representation point is as follows:

$$z_i = \Pi(^C p_{ft}^{(i)}) + n_{fi} \quad (62)$$

$$^C p_T^{(i)} = C(^C_G \bar{q})(^G p_T^{(i)} + C(^G_T \bar{q}^{(i)})^T p_{ft}^{(i)} - ^G p_I) \quad (63)$$

A residual of a measured value may be represented as follows:

$$r_{ft}^{(i)} \approx H_X^{(i)} \tilde{X} + H_{ft} {^C \tilde{p}_{ft}^{(i)}} + n_{ft} \quad (64)$$

$$H_X^{(i)} = \begin{bmatrix} 0 & \dots & J^{(i)} \lfloor (^G p_T^{(i)} + C(^G_T \bar{q}^{(i)})^T p_{ft}^{(i)}) \times \rfloor & -J^{(i)} C(^C_G \bar{q}) & \dots \end{bmatrix} \quad (65)$$

$$H_T^{(i)} = J^{(i)} C(^C_G \bar{q}) C(^G_T \hat{q}^{(i)}) \quad (66)$$

To reduce a calculation amount, in this embodiment of this disclosure, only an item related to a state vector is retained, and an item related to a feature point is marginalized. Therefore, the residual equations are separately projected to left zero spaces of $H_T^{(i)}$ and $H_{ft}^{(i)}$, to eliminate impact of $$^{C_i} \tilde{p}_T^{(i)}$$

and $^T \tilde{p}_{ft}$ (a specific manner is similar to that in 2.3), and these equations are combined into a large matrix equation, to obtain:

$$r_o^{(i)} \approx H_D^{(i)} \tilde{X} + n_D^{(i)} \quad (67)$$

Step 650: If the dynamic target cannot be tracked continuously, delete the dynamic target from an overall state vector, and correspondingly modify a covariance matrix.

Optionally, a system does not remove the dynamic target from the system state vector when the dynamic target is not observed the first time, because there are many reasons why the dynamic target is not detected, which may be single error detection or temporary blocking of the target. In this case, if the dynamic target is deleted rashly, correctness, continuity, and robustness of the system will be affected.

In addition, the system does not always retain information about the dynamic target in the state vector, because unnecessary calculation burden is caused in that case.

To avoid these negative effects, the dynamic target is deleted from the state vector and a covariance matrix is modified correspondingly only when the dynamic target cannot be tracked for a proper period of time. In a possible implementation, only a row and a column that correspond to the dynamic target need to be deleted.

In this embodiment of this disclosure, a scale of a system state vector is controlled within a specific range, to reduce unnecessary calculation complexity, and ensure that an algorithm can perform real-time processing.

(10) State Update Module 170:

A residual equation column of measurement results of a static feature point and a dynamic feature point is written into an equation, as shown in a formula (68):

$$r_o \approx H_o \tilde{X} + n_o \quad (68)$$

To reduce calculation complexity, QR decomposition is performed on $H_X$ to reduce dimensions, to obtain:

$$H_o = [Q_1 \; Q_2] \begin{bmatrix} T_H \\ 0 \end{bmatrix} \quad (69)$$

A result is substituted to obtain a final residual equation for updating, as shown in a formula (70):

$$r_n = T_H \tilde{X} + n_n \quad (70)$$

That is:

$$r_n = Q_1^T r_o \quad (71)$$

$$n_n = Q_1^T n_o \quad (72)$$

A Kalman gain K is calculated by using a formula (73):

$$K = P_{k|k} T_H^T (T_H P_{k|k-1} T_H^T + R_n)^{-1} \quad (73)$$

$R_n$ is a covariance matrix of noise $n_n$.

$P_{k|k-1}$ is used to represent a covariance matrix at a current moment (k) that is predicted based on updated $P_{k-1|k-1}$ at a previous moment (k−1).

$P_{k|k}$ is used to represent an updated covariance matrix at the current moment (k).

A state vector is updated by using formulas (74) and (75):

$$\Delta X = K r_n \quad (74)$$

$$X_{k|k} = X_{k|k-1} + \Delta X \quad (75)$$

$X_{k|k-1}$ is used to represent an overall state vector at a current moment (k) that is predicted based on updated $X_{k-1|k-1}$ at a previous moment (k−1).

$X_{k|k}$ is used to represent an updated overall state vector at the current moment (k).

A covariance matrix is updated by using a formula (76):

$$P_{k|k} = (I - K T_H) P_{k|k-1} (I - K T_H)^T + K R_n K^T \quad (76)$$

In this embodiment of this disclosure, a relatively good positioning result can still be obtained in a complex scenario, for example, in a case of occlusion, discontinuous observation, or fast movement.

The foregoing describes, in detail with reference to FIG. 1 to FIG. 6, the moving object tracking method provided in the embodiments of this disclosure. The following describes in detail embodiments of an apparatus of this disclosure with reference to FIG. 7 and FIG. 8. It should be understood that descriptions of the method embodiments correspond to descriptions of the apparatus embodiments. Therefore, for a part that is not described in detail, refer to the foregoing method embodiments.

Figure 7:
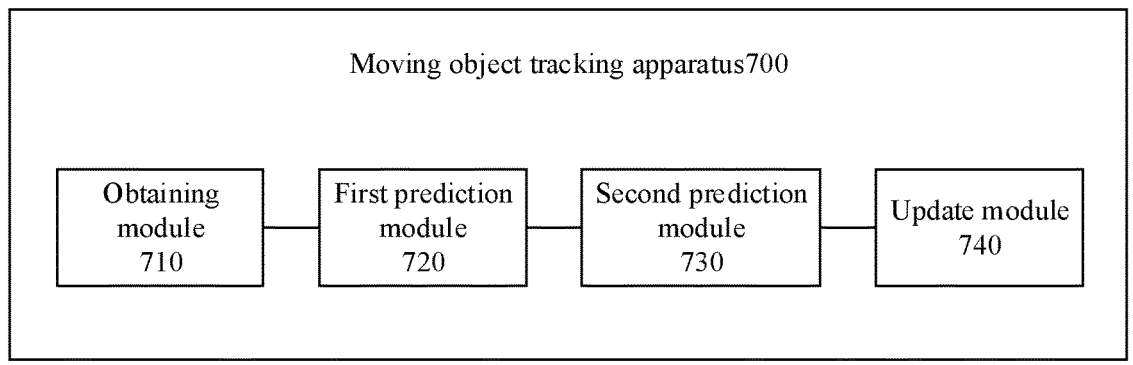
FIG. 7 is a schematic block diagram of a moving object tracking apparatus 700 according to an embodiment of this disclosure.

FIG. 7 is a schematic block diagram of a moving object tracking apparatus 700 according to an embodiment of this disclosure. The apparatus 700 may include:

an obtaining module 710, configured to obtain a current frame captured by a camera;

a first prediction module 720, configured to predict a current state vector of the camera based on an inertial measurement unit IMU and the current frame, to obtain a predicted value of the current state vector of the camera, where the current state vector of the camera is used to indicate a current pose of the camera;

a second prediction module 730, configured to predict a current state vector of a target object that is moving in the current frame, to obtain a predicted value of the current state vector of the target object, where the current state vector of the target object is used to indicate a current pose of the target object; and an update module 740, configured to update a Kalman state vector based on a measurement result of an image feature in the current frame, to obtain an updated Kalman state vector, where the updated Kalman state vector is used to indicate that the target object is tracked.

Optionally, the method 700 further includes:

a first calculation module 750, configured to calculate a Jacobian matrix of the image feature of the current frame based on an image feature of a background part in the current frame and an image feature of the target object; and the update module 740 is configured to:

update, based on the Jacobian matrix of the image feature of the current frame, the predicted value of the current state vector of the target object and the predicted value of the current state vector of the camera that are included in the Kalman state vector.

Optionally, the second prediction module 730 is configured to:

determine a dynamic feature point in the current frame, where the dynamic feature point includes a representation point and a non-representation point, the representation point is used as an origin of a coordinate system of the target object, and the non-representation point is used to represent another dynamic feature point other than the representation point on the target object; and predict, based on an attitude of the representation point and the random motion model, the current state vector of the target object in the moving state in the current frame, to obtain the predicted value of the current state vector of the target object.

Optionally, the method 700 further includes:

a second calculation module 760, configured to: when the representation point is blocked, calculate the attitude of the representation point by using an attitude of the non-representation point.

Optionally, the second prediction module 730 is configured to:
frame the target object in the moving state in the current frame by using a bounding box; and
determine a feature point in the bounding box as the dynamic feature point.

Optionally, the method 700 further includes:
a generation module 770, configured to: when the target object in the moving state is observed in a plurality of frames of images before the current frame, add the predicted value of the current state vector of the target object to a sliding window, to generate the Kalman state vector, where the sliding window includes the predicted value of the current state vector of the camera.

Optionally, the method 700 further includes:
a deletion module 780, configured to: if the target object in the moving state is not observed in the current frame within a preset time, delete the predicted value of the current state vector of the target object from the Kalman state vector.

Figure 8:
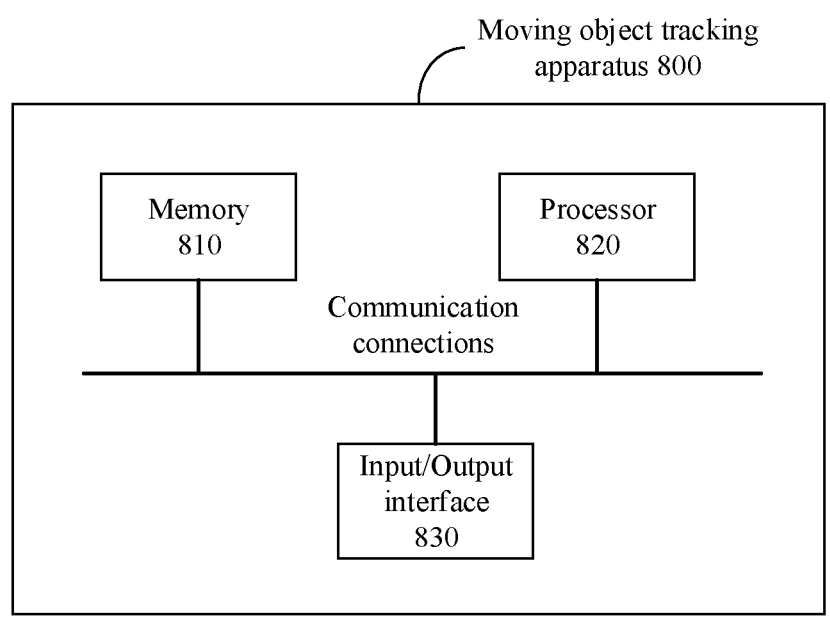
FIG. 8 is a schematic block diagram of a moving object tracking apparatus 800 according to an embodiment of this disclosure.

FIG. 8 is a schematic block diagram of a moving object tracking apparatus 800 according to an embodiment of this disclosure. The apparatus 800 may include: a memory 810, a processor 820, and an input/output interface 830.

The memory 810, the processor 820, and the input/output interface 830 are connected by using an internal connection path. The memory 810 is configured to store a program instruction. The processor 820 is configured to execute the program instruction stored in the memory 810, to control the input/output interface 830 to receive input data and information, and output data such as an operation result.

It should be understood that, the processor 820 in the embodiments of this disclosure may be a central processing unit (central processing unit, CPU), or may further be another general purpose processor, a digital signal processor (digital signal processor, DSP), an application specific integrated circuit (application specific integrated circuit, ASIC), a field programmable gate array (field programmable gate array, FPGA), or another programmable logical device, discrete gate or transistor logical device, discrete hardware component, or the like. The general purpose processor may be a microprocessor, or the processor may be any conventional processor or the like. Alternatively, the processor 820 uses one or more integrated circuits, and is configured to execute a related program, to implement the technical solutions provided in the embodiments of this disclosure.

The memory 810 may include a read-only memory and a random access memory, and provide an instruction and data to the processor 820. A part of the processor 820 may further include a non-volatile random access memory. For example, the processor 820 may further store information of a device type.

The memory 810 may be a read only memory (Read Only Memory, ROM), a static storage device, a dynamic storage device, or a random access memory (Random Access Memory, RAM). The memory 901 may store a program. When the program stored in the memory 810 is executed by the processor 820, the processor 810 is configured to perform steps in the embodiments of this disclosure.

In an implementation process, steps in the foregoing methods can be implemented by using a hardware integrated logical circuit in the processor 820, or by using instructions in a form of software. The method of the communication disclosed with reference to the embodiments of this disclosure may be directly performed by a hardware processor, or may be performed by using a combination of hardware in the processor and a software module. A software module may be located in a mature storage medium in the art, such as a random access memory, a flash memory, a read-only memory, a programmable read-only memory, an electrically erasable programmable memory, or a register. The storage medium is located in the memory 810, and a processor 820 reads information in the memory 810 and completes the steps in the foregoing methods in combination with hardware of the processor.

Specifically, the processor 820 obtains the stored instruction from the memory 810, and performs the following steps:
obtaining a current frame captured by a camera;
predicting a current state vector of the camera based on an inertial measurement unit IMU and the current frame, to obtain a predicted value of the current state vector of the camera, where the current state vector of the camera is used to indicate a current pose of the camera;
predicting a current state vector of a target object that is moving in the current frame, to obtain a predicted value of the current state vector of the target object, where the current state vector of the target object is used to indicate a current pose of the target object;
generating a Kalman state vector based on the predicted value of the current state vector of the camera and the predicted value of the current state vector of the target object; and
updating the Kalman state vector based on a measurement result of an image feature in the current frame, to obtain an updated Kalman state vector, where the updated Kalman state vector is used to indicate that the target object is tracked.

Optionally, a Jacobian matrix of the image feature of the current frame is calculated based on an image feature of a background part in the current frame and an image feature of the target object; and the predicted value of the current state vector of the target object and the predicted value of the current state vector of the camera that are included in the Kalman state vector are updated based on the Jacobian matrix of the image feature of the current frame.

Optionally, a dynamic feature point in the current frame is determined, where the dynamic feature point includes a representation point and a non-representation point, the representation point is used as an origin of a coordinate system of the target object, and the non-representation point is used to represent another dynamic feature point other than the representation point on the target object; and the current state vector of the target object in the moving state in the current frame is predicted based on an attitude of the representation point and the random motion model, to obtain the predicted value of the current state vector of the target object.

Optionally, when the representation point is blocked, the attitude of the representation point is calculated by using an attitude of the non-representation point.

Optionally, the target object in the moving state in the current frame is framed by using a bounding box; and a feature point in the bounding box is determined as the dynamic feature point.

Optionally, when the target object in the moving state is observed in a plurality of frames of images before the current frame, the predicted value of the current state vector of the target object is added to a sliding window, to generate the Kalman state vector, where the sliding window includes the predicted value of the current state vector of the camera.

Optionally, if the target object in the moving state is not observed in the current frame within a preset time, the predicted value of the current state vector of the target object is deleted from the Kalman state vector.

It should be noted that, in the apparatus 800 shown in FIG. 8, the processor 820 may invoke a computer program in the memory 810 to implement steps performed by modules. For example, the processor 820 may invoke a computer instruction stored in a cache to perform steps that need to be performed by the modules.

It should be understood that sequence numbers of the foregoing processes do not mean execution sequences in various embodiments of this disclosure. The execution sequences of the processes should be determined according to functions and internal logic of the processes, and should not be construed as any limitation on the implementation processes of the embodiments of this disclosure.

Optionally, this disclosure further provides a chip. The chip includes: a memory, configured to store a program; and a processor, configured to execute the program stored in the memory. When the program stored in the memory is executed, the processor is configured to perform the method in the first aspect.

Optionally, the processor may be a general purpose processor, and may be implemented by hardware or software. When implemented by hardware, the processor may be a logical circuit, an integrated circuit, or the like. When implemented by software, the processor may be a general purpose processor, and is implemented by reading software code stored in the memory. The memory may be integrated into the processor, or may be located outside the processor, and exist independently.

The memory, the processor, and an input/output interface are connected by using an internal connection path. The memory is configured to store a program instruction. The processor is configured to execute the program instruction stored in the memory, to control the input/output interface 830 to receive input data and information, and output data such as an operation result.

It should be understood that, the processor in the embodiments of this disclosure may be a central processing unit (central processing unit, CPU), or may further be another general purpose processor, a digital signal processor (digital signal processor, DSP), an application specific integrated circuit (application specific integrated circuit, ASIC), a field programmable gate array (field programmable gate array, FPGA), or another programmable logical device, discrete gate or transistor logical device, discrete hardware component, or the like. The general purpose processor may be a microprocessor, or the processor may be any conventional processor or the like. Alternatively, the processor uses one or more integrated circuits, and is configured to execute a related program, to implement the technical solutions provided in the embodiments of this disclosure.

The memory may include a read-only memory and a random access memory, and provide an instruction and data to the processor. A part of the processor may further include a non-volatile random access memory. For example, the processor may further store information of a device type.

In an implementation process, steps in the foregoing methods can be implemented by using a hardware integrated logical circuit in the processor, or by using instructions in a form of software. The method of the communication disclosed with reference to the embodiments of this disclosure may be directly performed by a hardware processor, or may be performed by using a combination of hardware in the processor and a software module. A software module may be located in a mature storage medium in the art, such as a random access memory, a flash memory, a read-only memory, a programmable read-only memory, an electrically erasable programmable memory, or a register. The storage medium is located in the memory, and a processor reads information in the memory and completes the steps in the foregoing methods in combination with hardware of the processor.

Specifically, the processor obtains the stored instruction from the memory, and performs the following steps:
  obtaining a current frame captured by a camera;
  predicting a current state vector of the camera based on an inertial measurement unit IMU and the current frame, to obtain a predicted value of the current state vector of the camera, where the current state vector of the camera is used to indicate a current pose of the camera;
  predicting a current state vector of a target object in the moving state in the current frame, to obtain a predicted value of the current state vector of the target object, where the current state vector of the target object is used to indicate a current pose of the target object;
  generating a Kalman state vector based on the predicted value of the current state vector of the camera and the predicted value of the current state vector of the target object; and
  updating the Kalman state vector based on a measurement result of an image feature in the current frame, to obtain an updated Kalman state vector, where the updated Kalman state vector is used to indicate that the target object is tracked.

Optionally, a Jacobian matrix of the image feature of the current frame is calculated based on an image feature of a background part in the current frame and an image feature of the target object; and the predicted value of the current state vector of the target object and the predicted value of the current state vector of the camera that are included in the Kalman state vector are updated based on the Jacobian matrix of the image feature of the current frame.

Optionally, a dynamic feature point in the current frame is determined, where the dynamic feature point includes a representation point and a non-representation point, the representation point is used as an origin of a coordinate system of the target object, and the non-representation point is used to represent another dynamic feature point other than the representation point on the target object; and the current state vector of the target object in the moving state in the current frame is predicted based on an attitude of the representation point and the random motion model, to obtain the predicted value of the current state vector of the target object.

Optionally, when the representation point is blocked, the attitude of the representation point is calculated by using an attitude of the non-representation point.

Optionally, the target object in the moving state in the current frame is framed by using a bounding box; and a feature point in the bounding box is determined as the dynamic feature point.

Optionally, when the target object in the moving state is observed in a plurality of frames of images before the current frame, the predicted value of the current state vector of the target object is added to a sliding window, to generate the Kalman state vector, where the sliding window includes the predicted value of the current state vector of the camera.

In another possible implementation, if the target object in the moving state is not observed in the current frame within a preset time, the predicted value of the current state vector of the target object is deleted from the Kalman state vector.

Optionally, this disclosure further provides a computer-readable medium. The computer-readable medium stores program code executed by a device, and the program code includes an instruction used to perform the method in FIG. 2.

Optionally, this disclosure further provides a computer program product including an instruction. When the computer program product is run on a computer, the computer is enabled to perform the method in FIG. 2.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this disclosure.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

Terminologies such as "component", "module", and "system" used in this disclosure are used to indicate computer-related entities, hardware, firmware, combinations of hardware and software, software, or software being executed. For example, a component may be, but is not limited to, a process that runs on a processor, a processor, an object, an executable file, a thread of execution, a program, and/or a computer. As shown in figures, both a computing device and an application that runs on a computing device may be components. One or more components may reside within a process and/or a thread of execution, and a component may be located on one computer and/or distributed between two or more computers. In addition, these components may be executed from various computer-readable media that store various data structures. The components may communicate by using a local and/or remote process and according to, for example, a signal having one or more data packets (for example, data from two components interacting with another component in a local system, a distributed system, and/or across a network such as the Internet interacting with other systems by using the signal).

It should be understood that in the embodiments of this disclosure, division of manners, cases, categories, and embodiments are merely for ease of description, and should not constitute a special limitation. Features in different manners, categories, cases, and embodiments may be combined provided that no contradiction is caused.

It should be further understood that, in the embodiments of this disclosure, "first", "second", "third", and the like are merely intended to represent different objects, and do not imply another limitation on the represented objects.

In addition, the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that in the embodiments of this disclosure, "B corresponding to A" indicates that B is associated with A, and B may be determined according to A. However, it should further be understood that determining A according to B does not mean that B is determined according to A only; that is, B may also be determined according to A and/or other information.

In the several embodiments provided in this disclosure, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this disclosure may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this disclosure essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of this disclosure. The foregoing storage medium includes: any medium that can store program code, such as a USB flash drive, a removable hard disk, a read-only memory (read-only memory, ROM), a random access memory (random access memory, RAM), a magnetic disk, or an optical disc.

The foregoing descriptions are merely specific implementations of this disclosure, but are not intended to limit the protection scope of this disclosure. Any variation or replacement readily figured out by a person skilled in the art within the technical scope disclosed in this disclosure shall fall within the protection scope of this disclosure. Therefore, the protection scope of this disclosure shall be subject to the protection scope of the claims.

What is claimed is:

1. A method for tracking an object, comprising:
   obtaining a current frame captured by a camera, wherein the camera is located in a vehicle;
   determining a current pose of the camera based on an inertial measurement unit IMU on the vehicle and the current frame;
   determining a current pose of a target object in the current frame, wherein the target object is located around the vehicle; and
   optimizing the current pose of the camera and the current pose of the target object to obtain a second pose of the camera and a second pose of the target object, wherein the second pose of the camera and the second pose of the target object are used to track the target object; and wherein the determining a current pose of a target object in the current frame comprises:

determining a dynamic feature point in the current frame, wherein the dynamic feature point comprises a representation point, and the representation point is used as an origin of a coordinate system of the target object; and predicting the current pose of the target object in the current frame based on an attitude of the representation point and a random motion model, to obtain the current pose of the target object.

2. The method according to claim 1, wherein the method further comprises:

calculating a Jacobian matrix of an image feature of the current frame based on an image feature of a background part in the current frame and an image feature of the target object; and updating the current pose of the camera and the current pose of the target object based on a measurement result of the image feature in the current frame comprises:

updating the current pose of the target object and the current pose of the camera based on the Jacobian matrix of the image feature of the current frame.

3. The method according to claim 1, wherein the dynamic feature point further comprises a non-representation point, and the non-representation point is used to represent another dynamic feature point other than the representation point on the target object; and the method further comprises:

when the representation point is blocked, calculating the attitude of the representation point by using an attitude of the non-representation point.

4. The method according to claim 1, wherein the determining a dynamic feature point in the current frame comprises:

framing a target object that is moving in the current frame by using a bounding box; and determining a feature point in the bounding box as the dynamic feature point.

5. The method according to claim 1, wherein the method further comprises:

adding the current pose of the target object to a sliding window, to generate a Kalman state vector, wherein the sliding window comprises the current pose of the camera.

6. The method according to claim 1, wherein the method further comprises:

if the target object in the moving state is not observed in a corresponding frame within a preset time, deleting a predicted value of a current state vector of the target object from the Kalman state vector.

7. An apparatus for tracking an object, comprising:

a memory configured to store instructions for a computer program;

a processor coupled to receive and execute the instructions which cause the apparatus to track a moving object by performing the steps of:

obtaining a current frame captured by a camera disposed in a vehicle;

determining a current pose of the camera based on an inertial measurement unit IMU on the vehicle and the current frame;

determining a current pose of a target object in the current frame, wherein the target object is located around the vehicle; and optimizing the current pose of the camera and the current pose of the target object to obtain a second pose of the camera and a second pose of the target object, wherein the second pose of the camera and the second pose of the target object are used to track the target object; and wherein the determining a current pose of a target object in the current frame comprises:

determining a dynamic feature point in the current frame, wherein the dynamic feature point comprises a representation point, and the representation point is used as an origin of a coordinate system of the target object; and predicting the current pose of the target object in the current frame based on an attitude of the representation point and a random motion model, to obtain the current pose of the target object.

8. The apparatus according to claim 7 further configured to receive and execute the instructions which cause the apparatus to track the moving object by performing the steps of:

calculating a Jacobian matrix of an image feature of the current frame based on an image feature of a background part in the current frame and an image feature of the target object; and updating the current pose of the camera and the current pose of the target object based on a measurement result of the image feature in the current frame comprises:

updating the current pose of the target object and the current pose of the camera based on the Jacobian matrix of the image feature of the current frame.

9. The apparatus according to claim 7, wherein the dynamic feature point further comprises a non-representation point, and the non-representation point is used to represent another dynamic feature point other than the representation point on the target object; and the method further comprises:

when the representation point is blocked, calculating the attitude of the representation point by using an attitude of the non-representation point.

10. The apparatus according to claim 7, wherein the determining a dynamic feature point in the current frame comprises:

framing a target object that is moving in the current frame by using a bounding box; and determining a feature point in the bounding box as the dynamic feature point.

11. The apparatus according to claim 7, wherein the method further comprises:

adding the current pose of the target object to a sliding window, to generate a Kalman state vector, wherein the sliding window comprises the current pose of the camera.

12. The apparatus according to claim 7 further configured to receive and execute the instructions which cause the apparatus to track the moving object by performing the step of, if the target object in the moving state is not observed in a corresponding frame within a preset time, deleting a predicted value of a current state vector of the target object from the Kalman state vector.

13. A apparatus for tracking a moving object, comprising:

an input/output interface, a processor, and a memory, wherein the memory is configured to store program instructions, and the processor is configured to execute the program instructions from the memory to perform the steps of:

obtaining a current frame captured by a camera, wherein the camera is located in a vehicle;

determining a current pose of the camera based on an inertial measurement unit IMU on the vehicle and the current frame;

determining a current pose of a target object in the current frame, wherein the target object is located around the vehicle; and optimizing the current pose of the camera and the current pose of the target object to obtain a second pose of the camera and a second pose of the target object, wherein the second pose of the camera and the second pose of the target object are used to track the target object; and wherein the determining a current pose of a target object in the current frame comprises:

determining a dynamic feature point in the current frame, wherein the dynamic feature point comprises a representation point, and the representation point is used as an origin of a coordinate system of the target object; and predicting the current pose of the target object in the current frame based on an attitude of the representation point and a random motion model, to obtain the current pose of the target object.

14. A nontransitory computer-readable storage medium, comprising a computer program, wherein when the computer program executed by a processor in an apparatus, causes the apparatus to perform the steps of:

obtaining a current frame captured by a camera, wherein the camera is located in a vehicle;

determining a current pose of the camera based on an inertial measurement unit IMU on the vehicle and the current frame;

determining a current pose of a target object in the current frame, wherein the target object is located around the vehicle; and optimizing the current pose of the camera and the current pose of the target object to obtain a second pose of the camera and a second pose of the target object, wherein the second pose of the camera and the second pose of the target object are used to track the target object; and wherein the determining a current pose of a target object in the current frame comprises:

determining a dynamic feature point in the current frame, wherein the dynamic feature point comprises a representation point, and the representation point is used as an origin of a coordinate system of the target object; and predicting the current pose of the target object in the current frame based on an attitude of the representation point and a random motion model, to obtain the current pose of the target object.

* * * * *